United States Patent [19]
Kato

[11] Patent Number: 5,953,529
[45] Date of Patent: Sep. 14, 1999

[54] DATA PROCESSOR WITH A DEBUG DEVICE AND A STACK AREA CONTROL UNIT AND CORRESPONDING DATA PROCESSING METHOD

[75] Inventor: Mikiko Kato, Tokyo, Japan

[73] Assignee: Nec Corporation, Tokyo, Japan

[21] Appl. No.: 08/739,829

[22] Filed: Oct. 30, 1996

[30] Foreign Application Priority Data

Oct. 31, 1995 [JP] Japan ................................. 7-282959

[51] Int. Cl.$^6$ ............................ G06F 9/455; G06F 11/00
[52] U.S. Cl. ..................................... 395/704; 395/183.14
[58] Field of Search ................................. 395/704, 591, 395/568, 590, 183.14; 711/132

[56] References Cited

U.S. PATENT DOCUMENTS

| | | | |
|---|---|---|---|
| 3,786,432 | 1/1974 | Woods | 365/230.09 |
| 3,924,245 | 12/1975 | Eaton et al. | 711/219 |
| 4,315,314 | 2/1982 | Russo | 395/591 |
| 4,488,227 | 12/1984 | Miu et al. | 395/591 |
| 4,491,912 | 1/1985 | Kainaga et al. | 395/590 |
| 5,132,972 | 7/1992 | Hansen | 395/183.14 |
| 5,274,817 | 12/1993 | Stahl | 395/670 |
| 5,355,469 | 10/1994 | Sparks et al. | 395/183.14 |
| 5,613,063 | 3/1997 | Eustace et al. | 395/183.14 |

FOREIGN PATENT DOCUMENTS 5-181703  7/1993  Japan .

*Primary Examiner*—Tariq R. Hafiz
*Assistant Examiner*—Brian Sattizahn
*Attorney, Agent, or Firm*—Foley & Lardner

[57] ABSTRACT

A data processor provided with a debug device which performs a simulation and debug on a user program for use in program development for a microcomputer which uses a stack area in order to save a program counter's value and a stack area control device which controls the stack areas in which the stack area control device comprises a using stack area control unit controlling the stack area used by an instruction including functions and interruption routines constituting the user program by use of the access mode information indicating write permit or write inhibit and a stack area access check unit detecting an abnormal access operation into the stack area on the basis of the access mode information.

13 Claims, 17 Drawing Sheets

531 STACK USING INFORMATION TABLE

| FUNCTION / INTERRUPTION ROUTINE NAME | STACK AREA FOR ARGUMENT (BYTE) | USING STACK AREA (BYTE) | INITIAL ADDRESS OF ACCESS MODE INFORMATION BUFFER (AS) |
|---|---|---|---|
| WHEN INITIALIZED | 0 | 1 | addr__init |
| __main | 0 | 6 | addr__main |
| __sub | 4 | 2 | addr__sub |

532 ACCESS MODE INFORMATION BUFFER

FIG. 5

10 USER PROGRAM

```
int sub(int,int);
void main(void)
{
    int i,j;
    i=4;
    j=2;
    sub(i,j);
}
sub(argl,arg2)
{
    return(arg1+arg2);
}
```

11 CONVERTED USER PROGRAM

```
_main:
    push    hl              11AA
    movw    ax,sp
    subw    ax,#04H
    movw    hl,ax
    movw    sp,ax           12
    movw    ax,#04H
    mov     [hl+3],a        13
    xch     a,x
    mov     [hl+2],a        14
    movw    ax,#02
    mov     [hl+1],a        15
    xch     a,x
    mov     [hl],a          16
    xch     a,x
    push    ax              17
    mov     a,[hl+2]
    xch     a,x
    mov     a,[hl+3]
    push    ax              18
    call    !_sub           19
    pop     ax              20AA
    pop     ax              21
    pop     ax              22
    pop     ax              23
    pop     hl              24
    ret                     25
_sub:
    push    hl              26
    movw    ax,sp
    movw    hl,ax
    mov     a,[hl+6]
    add     a,[hl+4]
    xch     a,x
    mov     a,[hl+7]
    addc    am,[hl+5]
    movw    bc,ax
    pop     hl              27
    ret                     28
```

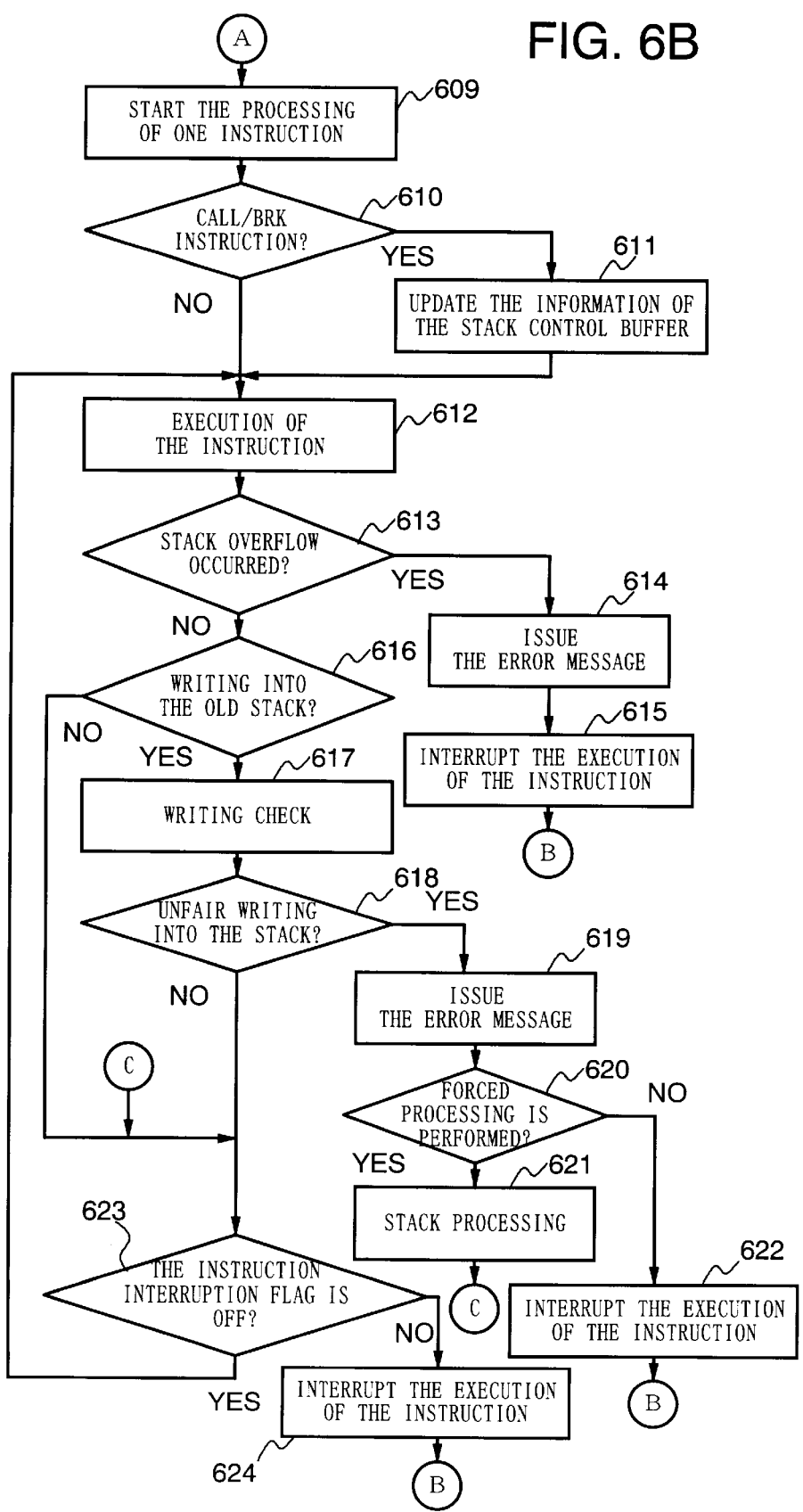

531A  STACK USING INFORMATION TABLE

| FUNCTION / INTERRUPTION ROUTINE NAME | STACK AREA FOR ARGUMENT (BYTE) | USING STACK AREA (BYTE) | INITIAL ADDRESS OF ACCESS MODE INFORMATION BUFFER (AS) |
|---|---|---|---|
| WHEN INITIALIZED | 0 | 1 | addr__init |
| __main | 0 | 6 | addr__main |
| __sub | 4 | 2 | addr__sub |

532A  ACCESS MODE INFORMATION BUFFER

FIG. 10

533A STACK CONTROL BUFFER

| ACCESS MODE AM | ACCESS MODE INFORMATION BUFFER | |
|---|---|---|
| | ADDRESS AS | BIT POSITION BP |
| 0 | addr_init | 0 |
| 0 | addr_main | 5 |
| 0 | addr_main | 4 |
| 1 | addr_main | 3 |
| 1 | addr_main | 2 |
| 1 | addr_main | 1 |
| 1 | addr_main | 0 |
| 0 | addr_sub | 7 |
| 0 | addr_sub | 6 |
| 0 | addr_sub | 5 |
| 0 | addr_sub | 4 |
| 0 | addr_sub | 3 |
| 0 | addr_sub | 2 |
| 0 | addr_sub | 1 |
| 0 | addr_sub | 0 |

C ↗ CHANGED TO 1

534A STACK

| Stack contents | SP |
|---|---|
| hl (L) | SP (6) |
| hl (H) | |
| PC (L) | SP (5) |
| PC (H) | |
| ax (L) | SP (4) |
| ax (H) | SP (3a) |
| ax (L) | SP (3) |
| ax (H) | |
| j | SP (2) |
| j | SP (1C) |
| i | SP (1b) |
| i | SP (1a) |
| hl (L) | SP (1) |
| hl (H) | |
| | SP (0) |

USE sub FUNCTION (SP(6) to SP(5))

USE IN THE ARGUMENT OF sub FUNCTION (SP(4) to SP(1))

A, B arrows pointing to ax (L) / ax (H) rows

DATA PROCESSOR WITH A DEBUG DEVICE AND A STACK AREA CONTROL UNIT AND CORRESPONDING DATA PROCESSING METHOD

BACKGROUNDS OF THE INVENTION

1. Field of the Invention

The present invention relates to a data processor and data processing methods. Particularly, it relates to a data processor and data processing method for use in the program development for a microcomputer which uses stack area in order to save program counter's values.

2. Description of the Related Art

A microcomputer saves the program counter's value indicating a restart instruction when returning to the function currently in operation, before the next function or interruption is executed. Stack area is used as a storage for preserving the program counter's values. The stack area is called a Last In-First Out (LIFO) memory, constituted in that the data entered last is taken out first.

Access address to the stack area is designated by a stack pointer (SP). The Sp's value varies according to the operation of the stack area, always indicating the latest access address onto the stack area. Therefore, the latest written data can be obtained on reading out from the stack area.

For example, the CALL instruction that is a subroutine instruction is executed at the function call. The CALL instruction saves the initial address of the instruction next to the function currently in operation as the PC's value for returning to the function currently in operation, on the stack area. Then, a branch address set up by the operand of the CALL instruction is saved in a program counter PC, and the function of a called party will be executed. A RET instruction, that is a return instruction from a subroutine, is executed at the end of the processing on the function of the called party. The execution of the instruction allows reading out a return address from a stack frame indicated by a SP to store the data into the program counter PC, and returning to the original function of the calling party.

An operation of saving the PC's values on the stack and returning there will be explained with reference to FIG. 12. A user program shown in FIG. 12 includes a main function 81 and a function of a called party 82.

The main function 81 includes instructions 811 "instA0", 812 "instB0", 813 (CALL instruction) "call !pc(A1)" and 814 "instC0". The initial addresses of the memory storing these instructions 811 to 814 are respectively defined as PC (A0), PC (B0), PC (call) and PC (C0). On the other hand, the function of the called party 82 includes instructions 821 "instA1", 822 "instB1" and 823 "ret". The initial addresses of the memory storing these instructions 821 to 823 are respectively defined as PC (A1), PC (B1) and PC (ret).

Further, the SP's value before executing the CALL instruction 813 is defined as SP (0) and the SP's value after executing the same is defined as SP (1).

When the CALL instruction 813 is read out during execution of the main function 81, the initial address PC (C0) of the instruction 814 next to the instruction 813 is saved on the stack 83 shown in FIG. 13 as the PC's value for return. The SP's value preserved in the stack 83 varies from SP (0) to SP (1) in accordance with the saving operation. The branch address PC (A1) designated by the object of the CALL instruction 813 is stored in the program counter PC, and then, the function of the called party 82 will be executed while reading the instructions sequentially from the instruction 821 of which the initial address is PC (A1). When the RET instruction 823 is read out at the end of the execution of the function of the called party 82, the PC's value for return is read out from the position designated by the current SP's value of the stack area 83, or SP (1), so to be set in the program counter PC, thereby resuming the processing of the main function from the instruction 814. The SP's value varies from SP (1) to SP (0) in accordance with the reading operation from the stack 83.

It is also possible to store in the stack area 83, the local variable and general purpose register's value used in the original function of the calling party, as well as the PC's value for return in the original function as mentioned above. A PUSH instruction is mainly used to save the values other than the PC's value on the stack area 83, and a POP instruction is mainly used to read out the values other than the PC's value from the stack area 83.

A storing and reading operation in and from the stack are 83 by the PUSH and POP instructions on the function values other than the PC's value, will be explained with reference to FIG. 14. A user program includes a main function 91 and a function of a called party 92.

The main function includes instructions 911 "instA0", 912 "instB0", 913 (CALL instruction) "call !pc (push)" and 914 "instC0". The initial addresses of the memory storing these instructions 911 to 914 are respectively defined as PC (A0), PC (B0), PC (call) and PC (C0). While, the function of a called party 92 includes instructions 921 (PUSH instruction) "push h1", 922 "instA1", 923 "instB1", 924 (POP instruction) "pop h1" and 925 "ret". The initial addresses of the memory storing these instructions 921 to 925 are respectively defined as PC (push), PC (A1), PC (B1), PC (pop) and PC (ret).

Further, the SP's values before and after executing the CALL instruction 913 are respectively defined as SP (0) and SP (1), and the SP value after executing the PUSH instruction is defined as SP (2).

When the CALL instruction 913 is read out during execution of the main function 91, the initial address PC (C0) of the instruction 914 next to the instruction 913 is saved on the stack 93 as the PC's value for return, as shown in FIG. 15. The SP's value preserved in the stack 93 varies from SP (0) to SP (1) in accordance with the saving operation. A branch address PC (push) designated by the object of the CALL instruction 913 is stored in the program counter PC, and then, the function of the called party 92 will be executed. The PUSH instruction 921 with the initial address PC (push) saves the data within the register h1 on the stack 93. The SP's value preserved in the stack 93 varies from SP (1) to SP (2).

Then, the instructions are sequentially read out to be executed. When the POP instruction 924 is read out in the function of the called party, the data is read out from the stack 93, so to be stored into the register h1. The SP's value in the stack 93 varies from SP (2) to SP (1). When the RET instruction 925 is read out at the end of the function of the called party, the PC's value for return is read out from the position designated by the current SP's value of the stack area, that is SP (1), so to be set in the program counter PC, thereby resuming the processing of the main function from the instruction 914. The SP's value in the stack 93 varies from SP (1) to SP (0) in accordance with the reading operation from the stack.

The processing will be the same in the case of calling functions in a nest shape. A flow of this calling processing will be explained with reference to FIGS. 16 and 17. The user program indicated in FIG. 16 includes a main function 101 and the functions of the first to n-th called parties 102 to 104.

The main function 101 includes instructions 1011 to 1014 (instA0, instB0, call !pc(push1), instC0). The initial addresses of the memory storing these instructions are respectively defined as PC (A0), PC (B0), PC (call0) and PC (C0). The function of the first called party 102 includes instructions 1021 to 1027 (pushh1, instA1, instB1, call !pc, instC1, pop h1, ret). The initial addresses of the memory storing these instructions 1021 to 1027 are respectively defined as PC (push1), PC (A1), PC (B1), PC (call1), PC (C1), PC (pop1) and PC (ret1).

Similarly, the function of the (n-1)th called party 103 includes instructions 1031 to 1037 (push h1, instA (n-1), instB (n-1), call !pc (pushn), instC (n-1), pop h1, ret). The initial addresses of the memory storing these instructions 1031 to 1037 are respectively defined as PC (push (n-1)), PC (A (n-1)), PC (B (n-1)), PC (call (n-1)), PC (C (n-1)), PC (pop (n-1)) and PC (ret (n-1)).

The function of the n-th called party 104 includes instructions 1041 to 1046 (push h1, instAn, instBn, instCn, pop h1, ret). The initial addresses of the memory storing these instructions are respectively defined as PC (pushn), PC (An), PC (Bn), PC (Cn), PC (popn) and PC (retn).

When the CALL instruction 1013 is read out during the execution of the main function 101, the initial address PC (C0) of the next instruction 1014 is saved on the stack 105 shown in FIG. 17 as the PC's value for return. At this time, the SP's value varies from SP (0) to SP (1a) in accordance with the saving operation. Next, the branch address PC (push1) designated by the object of the CALL instruction 1013 is stored in the program counter PC, and then, the function of the first called party 102 will be executed. The instruction 1021 with the initial address PC (push1) saves the data within the register h1 on the stack 105. At this time, the SP's value varies from SP (1a) to SP (1b).

Thereafter, the instructions are sequentially read out to be executed. When the CALL instruction 1024 is read out, the initial address PC (C1) of the next instruction 1025 is saved on the stack 105 as the PC's value for return, and the SP's value varies from SP (1b) to SP (2a). Next, the branch address PC (push2) designated by the object of the CALL instruction 1024 is stored in the program counter PC, and then, the function of the next called party will be executed. Similarly, when the CALL instruction 1034 is read out during execution of the function of the (n-1)th called party 103, the initial address PC (C (n-1)) of the next instruction 1035 is saved on the stack 105 as the PC's value for return, and the SP's value varies from SP ((n-1) b) to SP (na). Next, the branch address PC (pushn) designated by the object of the CALL instruction 1034 is stored in the program counter PC, and the function of the n-th called party 104 will be executed this time. The instruction 1041 with the initial address PC (pushn) saves the data within the register h1 on the stack 105. The SP's value varies from SP (na) to SP (nb).

Thereafter, the instructions are sequentially read out to be executed. When the POP instruction 1045 is read out, the data is read out from the stack 105 to be stored in the register h1. At this time, The SP's value varies from SP (nb) to SP (na). When the RET instruction 1046 is read out, the PC's value for return is read out from the position designated by SP (na), that is the current SP's value of the stack area 105, so to be set in the program counter, thereby resuming the processing of the function of the (n-1)th called party 103 from the instruction 1035. The SP's value varies from SP (na) to SP ((n-1) b) in accordance with the reading operation from the stack 105.

When the POP instruction 1036 is read out, the data is read out from the stack 105 to be stored in the register h1. The SP's value varies from SP ((n-1) b) to SP ((n-1) a). The RET instruction 1037 reads out the PC's value for return from the position designated by the current SP's value of the stack, that is SP ((n-1) a), so to set it in the program counter PC, thereby resuming the processing of the function of the (n-2)th called party. The SP's value varies from SP ((n-1) a) to SP ((n-2) b). Similarly, it returns to the function of the first called party 102, so to execute the instruction 1025. When the POP instruction 1026 is read out, the data is read out from the stack 105 to be stored into the register h1. The SP's value varies from SP (1b) to SP (1a). The RET instruction 1027 reads out the PC's value for return from the position designated by the current SP's value of the stack 105, that is SP (1a), sets it in the program counter PC, and the processing of the main function 101 resumes from the instruction 1014, when the SP's value varies from SP (1a) to SP (0). In this way, the processing can be returned to the main function 105.

A stack managing method of the first conventional data processor will be described with reference to the flow chart of FIG. 18.

At first, after activating a simulator that is a data processor, a user program is downloaded (Step 1801) and the information on the stack area obtained as a debug information is stored (Step 1802). Then, the data processor is in the command input waiting state (Step 1803). When it detects a command input (Step 1804), the command processing is executed (Step 1805). If the command is an end command to terminate the data processor (Step 1806), the data processor is terminated. As the result of the command processing, if an instruction execution flag has been set on the command (Step 1807), the data processor starts the execution of one instruction (Step 1808).

It is checked whether there exists a stack overflow such as stacking on the memory other than the stack area (Step 1810) during execution of the instruction (Step 1809). At the occurrence of the stack over flow, an error message is displayed (Step 1812), the instruction is interrupted (Step 1813) and the data processor goes into the command input waiting mode (Step 1803).

When the instruction interruption flag, which is set caused by errors and occurrence of breaks, is OFF after the completion of the instruction execution (Step 1811), the processing goes to the next instruction. When there arises a necessity to handle a break point or the like and the instruction interruption flag is turned to ON, the execution of the instruction is interrupted (Step 1813), and it goes into the command input waiting mode (Step 1803).

Thus, the first conventional data processor is provided with a function to check whether the stack operation is performed within the stack area or not. However, it is not provided with a function to check any unreasonable writing into the stack area or abnormal operation of the stack pointer.

As mentioned above, it is possible to store in the stack area the information on saving the return PC's value and local data at the execution of the function and interruption, or the like. However, if the value saved on the stack is carelessly rewritten, it is impossible to run the program properly. For example, if the saved PC's value is rewritten, the processing cannot return to the proper return position, so that there occurs a change in the running stream of the program, or a run-away of the program. Also in the case of rewriting the other values, the data is destructed, so that the proper operation cannot be executed at the return PC. Generally, since the stack area is placed on a part of a memory, the data within this area may be unfavorably changed not only by the stack operational instruction, but also by the writing instruction for memory.

In order to solve this problem, the second conventional data processor disclosed in the Japanese Patent Laid-Open Publication No. 5-181703 (Article 1) is provided with, in addition to a general stack area, a stack proposed only to save the PC's value (hereinafter, referred to as a PC stack), a PC stack pointer PCSP for designating a PC stack, a register SR0 which preserves the initial value of the PCSP and a register SR1 which varies according to the PCSP, thereby making it possible to check the writing into the PC stack.

The state of the PC stack 111 and the general stack 112 of the above second conventional data processor will be respectively described with reference to FIGS. 19 and 20. Before starting the program, the initial value of the PC stack pointer PCSP is transferred to the registers SR0 and SR1. Hereinafter, the value of the register SR0 is not changed until the value of the PC stack pointer PCSP is initialized. The general stack 112 is used in saving and returning the values other than the PC's value, while the PC stack 111 is only used in saving and returning the PC's value like a CALL instruction and a RET instruction.

This time, an operation of the second conventional data processor when its running the program of FIG. 16, will be described with reference to FIGS. 16, 19 and 20.

In the state of the PC stack 111 shown in FIG. 19, the value of the PC stack pointer PCSP before the execution of the CALL instruction 1013 of the main function 101 is defined as PCSP (0), and the value of the PC stack pointer PCSP after the execution of the CALL instruction 1034 of the function of the (n-1)th called party is defined as PCSP (n).

In the state of the general stack 112 shown in FIG. 20, the SP's value before the execution of the PUSH instruction 1021 of the function of the first called party is defined as SP (0), and the SP's value after the execution of the PUSH instruction 1041 of the function of the n-th called party is defined as SP (n).

When the CALL instruction 1013 is read out during execution of the main function 101, the value of the initial address PC (C0) of the next instruction 1014 is saved on the PC stack 111 as the PC's value for return. At this time, as illustrated in FIG. 19, the value of the PC stack pointer PCSP varies from PCSP (0) to PCSP (1) according to the saving operation. Simultaneously with the change in the value of the PC stack pointer PCSP, the value of the register SR1 varies to the same value as the PCSP (1). Next, the branch address PC (push1) designated by the object of the CALL instruction 1013 is stored in the program counter PC, and then, the function of the first called party 102 will be executed. The PUSH instruction 1021 with the initial address PC (push1) saves the data within the register h1 on the general stack 112. At this time, the SP's value varies from SP (0) to SP (1) as shown in FIG. 20.

Thereafter, the instructions will be sequentially executed. When the CALL instruction 1024 is read out, the value of the initial address PC (C1) of the next instruction 1025 is saved on the PC stack 111 as the PC's value for return. Here, the value of the PC stack pointer PCSP varies from PCSP (1) to PCSP (2), and simultaneously, the value of the register SR1 varies to the same value as the PCSP (2). Next, the branch address PC (push2) designated by the CALL instruction 1024 is stored in the program counter PC, and then, the function of the next called party will be executed.

Similarly, when the CALL instruction 1034 is read out during execution of the function of the (n-1)th called party 103, the value of the initial address PC (C (n-1)) of the next instruction 1035 is saved on the stack 111 as the PC's value for return. The value of the PC stack pointer PCSP varies from PCSP (n-1) to PCSP (n), and the value of the register SR1 varies to the same value as the PCSP (n).

The branch address PC (pushn) is stored in the program counter PC, and then, the function of the n-th called party 104 will be executed.

The PUSH instruction 1041 with the initial address PC (pushn) saves the data within the register h1 on the general stack 112. The SP's value varies from SP (n-1) to SP (n). Thereafter, the instructions are sequentially executed. When the POP instruction 1045 is read out, the data is read out from the general stack 112 to be stored in the register h1. The SP's value varies from SP (n) to SP (n-1). When the RET instruction 1046 is read out, the PC's value for return is read out from the position designated by the current value PCSP (n) of the stack 111, so to be set in the program counter, and the processing of the function of the (n-1)th called party resumes from the instruction 1035.

The value of the PC stack pointer PCSP varies from PCSP (n) to PCSP (n-1) according to the reading operation from the stack 111, and simultaneously, the value of the register SR1 varies to the same value as the PCSP (n-1). When the POP instruction 1036 is read out, the data is read out from the stack 112 to be stored in the register h1. The SP's value varies from SP (n-1) to SP (n-2). The RET instruction 1037 reads out the PC's value for return from the position designated by the current value PCSP (n-1) of the PC stack 111 and sets it in the program counter, thereby to resume the processing on the function of the (n-2)th called party. The PCSP's value varies from PCSP (n-1) to PCSP (n-2), and the value of the register SR1 varies to the same value as the PCSP (n-2) simultaneously.

In the same way, the processing returns to the function of the first called party 102, where the instruction 1025 is executed. When the POP instruction 1026 is read out, the data is read out from the general stack 112 so as to be stored in the register h1. The SP's value varies from SP (1) to SP (0). The RET instruction 1027 reads out the PC's value for return from the position designated by the current value PCSP (1) of the PC stack 111 and sets it in the program counter PC, thereby to resume the processing on the main function 101 from the instruction 1014. The value of the PC stack pointer PCSP varies from PCSP (1) to PCSP (0), and the value of the register SR1 varies to the same value as the PCSP (0) simultaneously. Thus, the processing can return to the step of the main function 101.

In the writing operation into the memory during execution of the instruction, the value of the writing address in the memory and the values of the registers SR0 and SR1 are compared with each other. If the above address in the memory exists within the registers SR0 and SR1, a write inhibit error is generated.

In this way, the second conventional data processor is provided with two kinds of stack areas, a PC stack area proposed only to save the PC's value and a general stack area proposed to save the other data, thereby preventing from unreasonable rewriting of the PC's value saved on the stack area. This data processor, however, in which originally one stack area is divided into two areas, needs two stack pointers in order to operate these stack areas and a register in order to control the areas. Therefore, the hardware components provided for the data processor is unfavorably increased. Additionally, since it takes no consideration of the unreasonable rewriting of the value saved on the general stack, there is a fear of making the local data of the calling party or the like destructed and a fear of running the program unfavorably after return.

As set forth hereinabove, in the first conventional data processor, since the stack area is provided in a part of the general memory, there is a fear of changing the content of the data not only by the stack operational instruction, but also by the writing instruction into the general memory, in other words, a fear of unreasonable rewriting. If the above unreasonable rewriting happens in the stored value such as the return PC's value and local data saved on the stack area, in the execution of the function and interruption, running the proper program becomes impossible in the first conventional data processor.

Since the second conventional data processor is provided with two kinds of stack areas, a PC stack area proposed only to save the PC's value and a general stack area proposed to save the other data, and further provided with two stack pointers for the operation of these areas and a register for controlling each area, it is defective in that the hardware becomes large in scale. Since it takes no consideration on the unreasonable rewriting of the value saved on the general stack, the local data of the calling party may be so destructed that the program cannot run properly after return.

SUMMARY OF THE INVENTION

A first object of the present invention is to provide a data processor and data processing method capable of previously preventing defects such as destruction of data, abnormal running of a program, run-away of a program or the like caused by the unreasonable writing onto the stack area.

A second object of the present invention is to provide a data processor and data processing method capable of preventing defects such as destruction of data, abnormal running of a program, run-away of a program or the like caused by the unreasonable writing onto the stack area, without providing it with two kinds of stack areas; a PC stack area proposed only to save the PC's value and a general stack area proposed to save the other data, two stack pointers for their operation, and a register for controlling each area, in the other words, without making the hardware large in scale.

According to the first aspect of the invention, a data processor, for use in program development for a microcomputer which uses a stack area in order to save a program counters value, provided with a debug means for performing a simulation and a debug on a user program and a stack area control means for controlling the stack area, wherein the stack area control means comprises a using stack area control means for controlling the stack area used by an instruction including functions and interruption routines constituting the user program, according to an access mode information indicating write permit or write inhibit; and a stack area access check means for detecting an abnormal access operation in the stack area on the basis of the access mode information.

In the preferred construction, the using stack area control means comprises a stack using information table with a size information on the stack area used for an argument, a size information on the stack area used for a process execution and an initial address of an access mode information buffer referred to, recorded thereon, as for each of the functions and interruption routines, an access mode information buffer which stores a flag indicating write permit or write inhibit in every area by the storing unit, depending on the using area size of the stack area, in every function and interruption routine, and a stack control buffer which, correspondingly to each frame of the stack area, stores the flags in the number of the size of the using stack area in reference to said access mode information buffer, as access mode information referred to at the write check into the stack area by said stack area access check means.

In the preferred construction, the stack control buffer stores an initial address of said access mode information buffer referred to and a bit position information on the flag stored as the access mode information in said access mode information buffer.

Also, the access mode information buffer has flag storing areas in the number as summed up by the size of the stack area used for the argument, the size of the stack area used for the process execution and the size of the stack area for saving the program counter's value.

In another preferred construction, the stack area access check means performs an access check only on the writing into the stack area previous to that of the current stack pointer on the basis of the access mode information, and as for the write demand into the stack area where the access mode information is of write inhibit, issues a message indicating that the writing is unreasonable, then to request a user to confirm the execution of a forced writing.

In another preferred construction, the using stack area control means comprises an access mode information changing means for forcibly changing the access mode information stored in said stack control buffer controlled by said using stack area control means, and the stack area access check means performs an access check only on the writing into the stack area previous to that of the current stack pointer with reference to the access mode information of said stack control buffer and as for the write demand into the stack area where the access mode information is of write inhibit, issues a message indicating that the writing is unreasonable, then to request a user to confirm the execution of the forced writing, and the access mode information changing means changes the access mode information corresponding to the write demanded stack area of said stack control buffer upon receipt of the forced writing request at the confirmation of the forced writing.

In the above-mentioned construction, the using stack area control means comprises a stack using information table with a size information on the stack area used for an argument, a size information on the stack area used for a process execution and an initial address of an access mode information buffer referred to, recorded thereon, as for each of the functions and interruption routines, an access mode information buffer which stores a flag indicating write permit or write inhibit in every area by the storing unit depending on the using area size of the stack area, in every function and interruption routine, and a stack control buffer which, correspondingly to each frame of the stack area, stores the flags in the number of the size of the using stack area in reference to said access mode information buffer, as access mode information referred to at the write check into the stack area by said stack area access check means, and stores an initial address of said access mode information buffer referred to and a bit position information on the flag stored as the access mode information in said access mode information buffer, the using stack area control means comprises a means for forcibly changing the access mode information stored in said stack control buffer controlled by said using stack area control means and the flag of said access mode information buffer, the stack area access check means performs an access check only on the writing into the stack area previous to that of the current stack pointer with reference to the access mode information of said stack control buffer and as for the write demand into the stack area where the access mode information is of write inhibit, issues a message indicating that the writing is unreasonable, then to request a user to confirm the execution of the forced writing, and the access mode information changing means changes the access mode information corresponding to the write demanded stack area of said stack control buffer upon receipt of the forced writing request at the confirmation of the forced writing.

According to the second aspect of the invention, a data processor, for use in program development for a microcomputer which uses a stack area in order to save the program counter's value, provided with a debug means for performing a simulation and a debug on a user program and a stack area control means for controlling the stack area, wherein the stack area control means comprises a using stack area control means for controlling the stack area used by an instruction including functions and interruption routines constituting the user program, according to an access mode information indicating write permit or write inhibit; and a stack area access check means for detecting an abnormal access operation in the stack area on the basis of the access mode information;

said using stack area control means comprising:

a stack using information table with a size information on the stack area used for an argument, a size information on the stack area used for a process execution and an initial address of an access mode information buffer referred to, recorded thereon, as for each of the functions and interruption routines;

an access mode information buffer which stores a flag indicating write permit or write inhibit in every area by the storing unit depending on the using area size of the stack area, in every function and interruption routine; and a stack control buffer which, correspondingly to each frame of the stack area, stores the flags in the number of the size of the using stack area in reference to said access mode information buffer, as access mode information referred to at the write check into the stack area by said stack area access check means;

the stack area access check means performs an access check only on the writing into the stack area previous to that of the current stack pointer with reference to the access mode information of said stack control buffer, and as for the write demand into the stack area where the access mode information is of write inhibit, issues a message indicating that the writing is unreasonable, then to request a user to confirm the execution of the forced writing.

In the preferred construction, the using stack area control means comprises a means for forcibly changing the access mode information stacked in said stack control buffer controlled by said using stack area control means, and the access mode information changing means changes the access mode information corresponding to the write demanded stack area of said stack control buffer upon receipt of the forced writing request at the confirmation of the forced writing.

According to another aspect of the invention, a data processing method of performing a simulation and debug on a user program for use in program development for a microcomputer which uses a stack area in order to save a program counter's value, comprises the steps of:

a step of registering information on the stack area used by an instruction including functions and interruption routines constituting the user program and access mode information indicating whether the stack area is write permitted or not in every storing unit, into a stack area control means for controlling the stack area;

a step of updating the access mode information of the stack area being used, which varies during execution of the user program, by storing the same information into said stack area control means one after another; and a step of checking unreasonable writing into the stack area on the basis of the access mode information.

In the preferred construction, a data processing method further comprises a step of issuing a message indicating the occurrence of the unreasonable writing access into the stack area if it is detected in said unreasonable write check step, a step of issuing a message requesting a user to confirm the execution of the forced writing by means of the writing access, and a step of executing the writing access when receiving the force writing demand at the confirmation of the forced writing.

In the preferred construction, a data processing method further comprises a step of issuing a message indicating the occurrence of the unreasonable writing access into the stack area if it is detected in said unreasonable write check step, a step of issuing a message requesting a user to confirm the execution of the forced writing by means of the writing access, and a step of executing the writing access when receiving the force writing demand at the confirmation of the forced writing, and as for the writing access, changing the access mode information of said stack area control means into write permit mode.

In this case, the using stack area control means comprises a stack using information table with a size information on the stack area used for an argument, a size information on the stack area used for a process execution and an initial address of an access mode information buffer referred to, recorded thereon, as for each of the functions and interruption routines, an access mode information buffer which stores a flag indicating write permit or write inhibit in every area by the storing unit depending on the using area size of the stack area, in every function and interruption routine, and a stack control buffer which, correspondingly to each frame of the stack area, stores the flags in the number of the size of the using stack area in reference to said access mode information buffer, as the access mode information referred to at the write check into the stack area by said stack area access check means, and which stores an initial address of said access mode information buffer referred to and a bit position information on the flag stored as the access mode information in said access mode information buffer, and in said unreasonable write check step, an access check is performed only on the writing into the stack area previous to that of the current stack pointer with reference to the access mode information of said stack control buffer.

Also, a data processing method further comprises a step of issuing a message indicating the occurrence of the unreasonable writing access into the stack area if it is detected in said unreasonable write check step, a step of requesting a user to confirm the execution of the forced writing as for the unreasonable writing access, and a step of, upon receipt of the forced writing demand at the confirmation of the forced writing, changing the access mode information corresponding to the writing demanded stack area in said stack control buffer, into write permit mode.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings

FIG. 5 is a schematic view for use in describing one example of a user program.

FIG. 6A and FIG. 6B are a flow chart for use in describing a data processing method according to the first embodiment of the present invention.

FIG. 10 is a schematic view for use in describing the state of the stack control buffer and the stack of the using stack area control unit corresponding to the user program of FIG. 7.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessary obscure the present invention.

Figure 1:
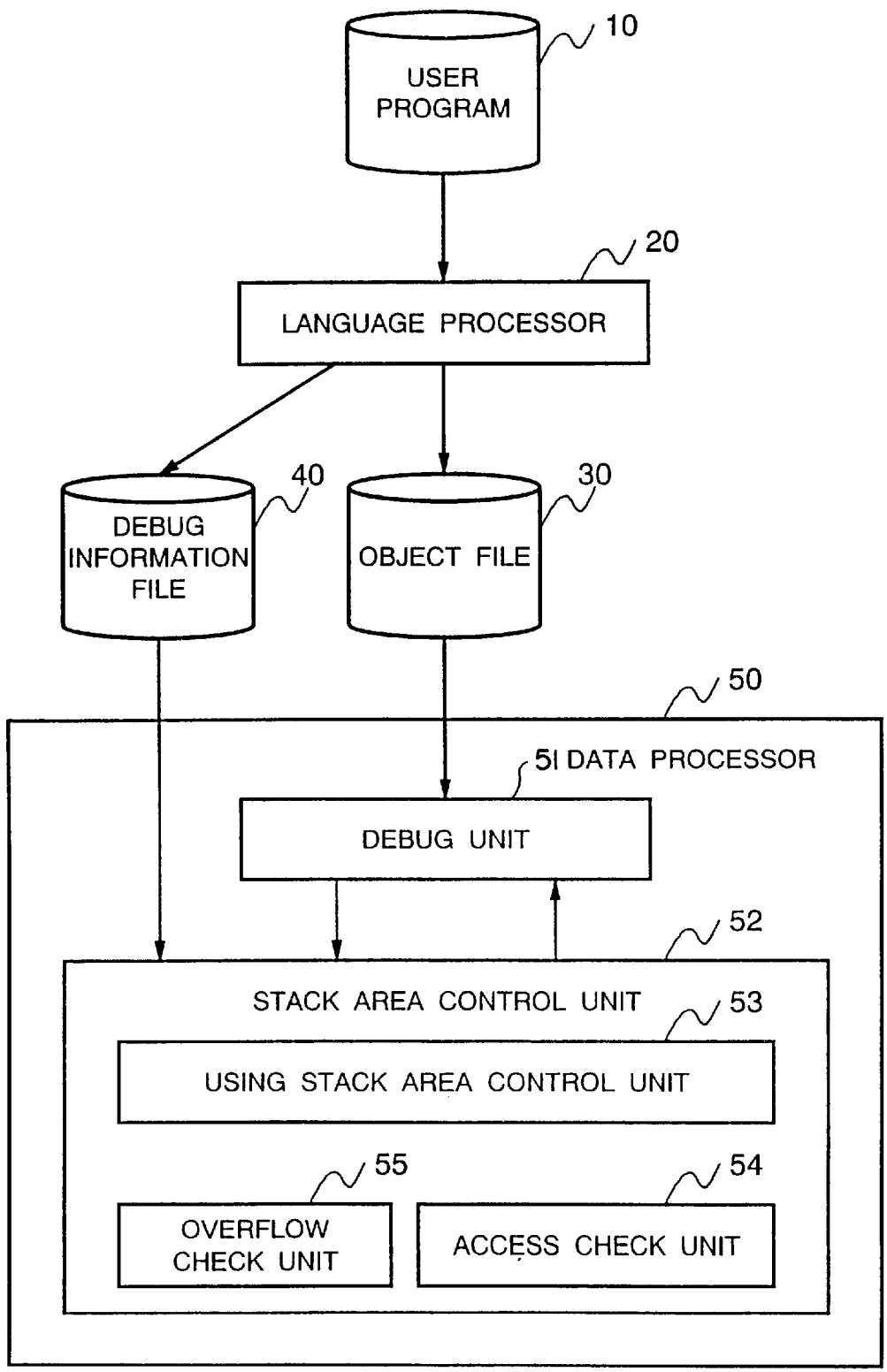
FIG. 1 is a block diagram showing a constitution of a first embodiment of a data processor according to the present invention.

As shown in FIG. 1, a data processing system including a data processor according to the present invention, comprises a user program 10, an object file 30, a language processor 20 which converts the user program 10 to the object file 30, a debug information file 40 including information on using a stack and user commands for designating a stack area, and a data processor 50.

The data processor 50 comprises a debug unit 51 for performing a simulation and debug on the user program 10 and a stack area control unit 52 for controlling a stack area. The stack area control unit 52 is provided with, in addition to a conventional overflow check unit 55 which checks a stack overflow, a using stack area control unit 53 which creates a stack using information table 531 described below, an access mode information buffer 532 and a stack control buffer 533 on the basis of the debug information file 40, and an access check unit 54 which checks a writing access onto the stack area on the basis of the access mode information of the stack control buffer 533.

An operation of this embodiment will be described with reference to FIG. 1, FIGS. 2 to 4 showing in detail the stack using information table 531 the access mode information buffer 532 and the stack control buffer 533 of the using stack area control unit 53, and FIG. 5 showing one example of a program according to this embodiment.

The language processor 20 converts the user program 10 to the object file 30. At this time, the debug information file 40 with the information on using the stack by each function and interruption routine of the user program 10 stored therein is created. The data processor 50 performs the simulation and debug in the debug unit 51 by downloading the object file 30 and the debug information file 40.

A stack area can be decided by the information on using a stack and user commands for designating a stack area within the debug information file 40. In order to control the stack by the use of the information on the stack area which can be obtained in this way, the first conventional data processor is provided with a stack overflow check function of checking whether the stack operation is performed within the stack area or not.

As mentioned above, in the data processor 50 of this embodiment, the stack area control unit 52 is reinforced with the using stack area control unit 53 and the access check unit 54, in addition to the above stack overflow check function.

Figures 2, 3:
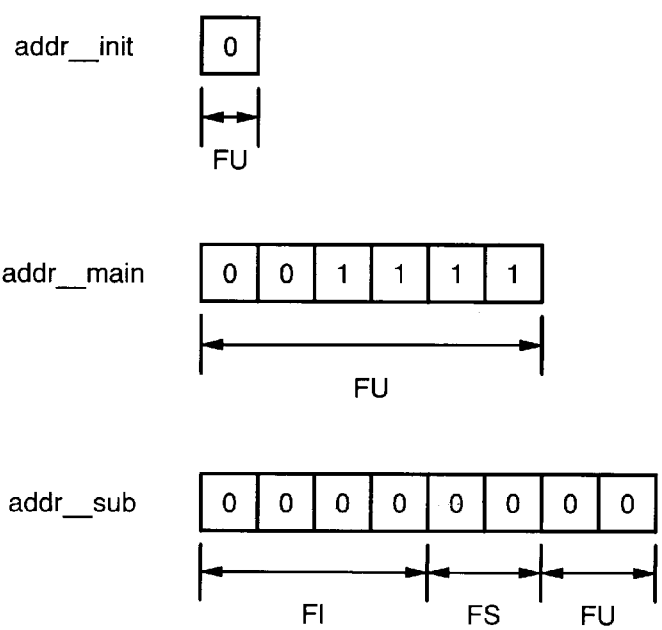
FIG. 2 is a schematic view for use in describing the state of a stack using information table of a using stack area control unit in the form of the first embodiment.
FIG. 3 is a schematic view for use in describing the state of an access mode information buffer of the using stack area control unit in the form of the first embodiment.
Figure 4:
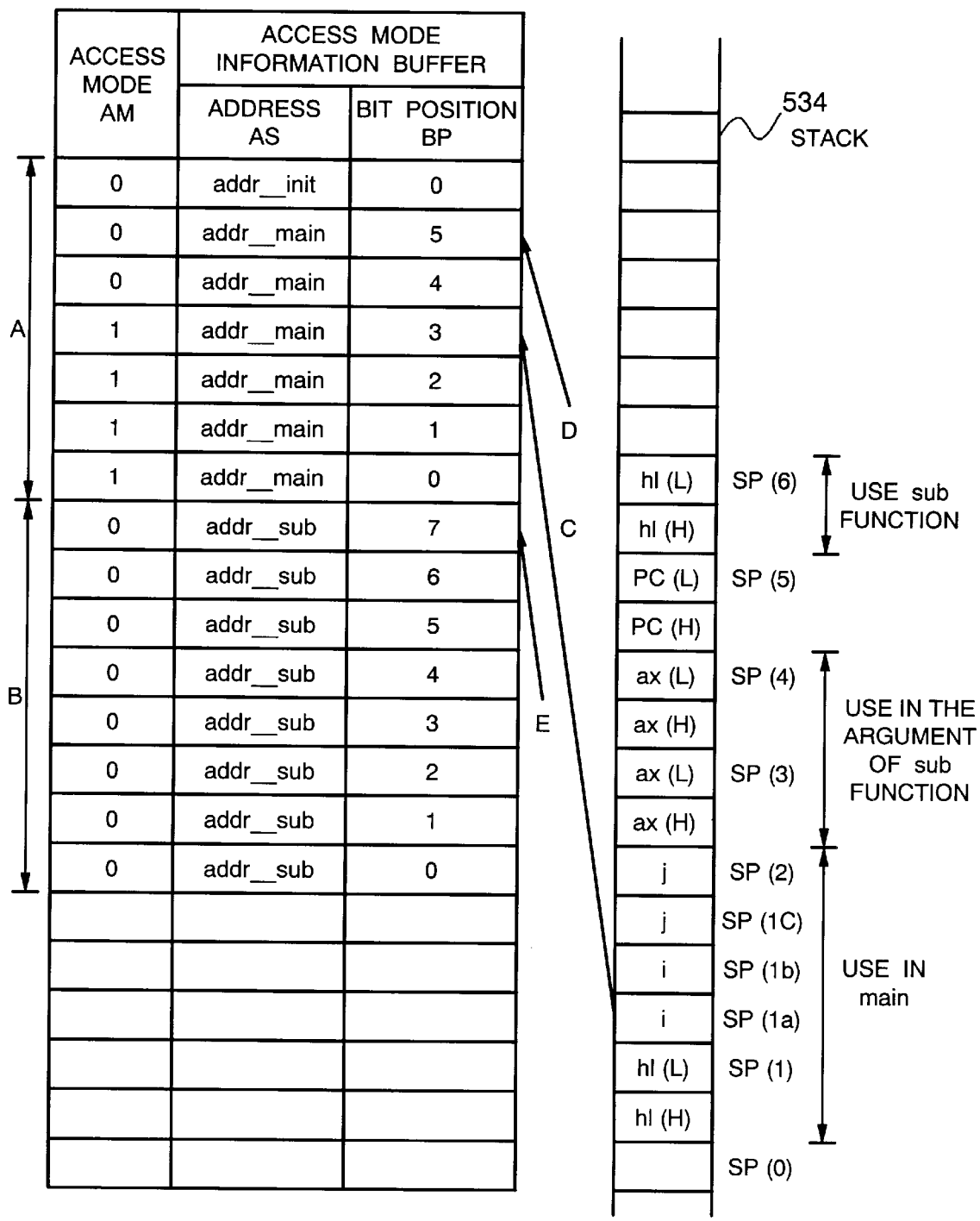
FIG. 4 is a schematic view for use in describing the state of a stack control buffer and a stack of the using stack area control unit in the form of the first embodiment.
Figure 6A:
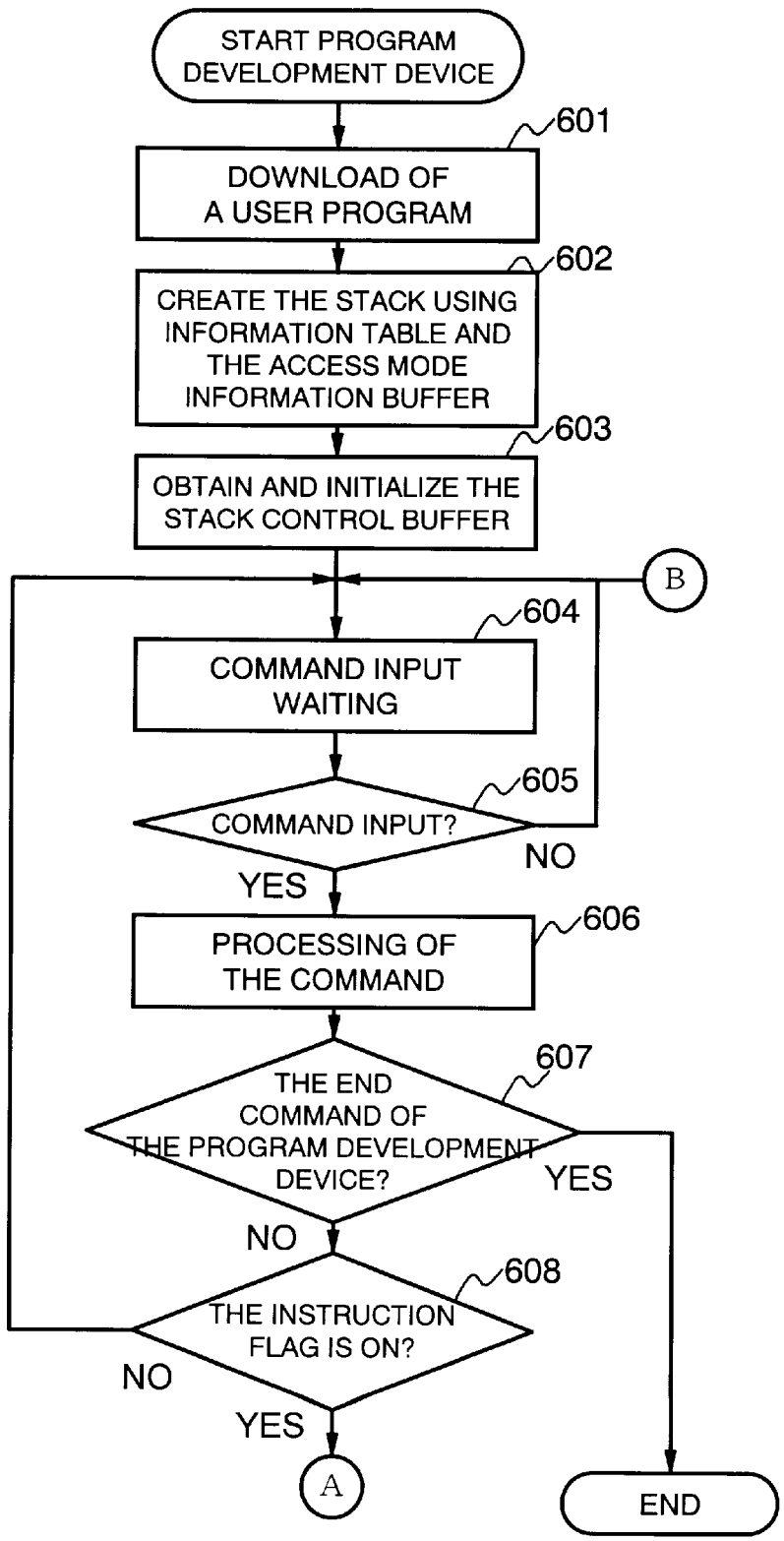

As shown in FIGS. 2 to 4, the using stack area control unit 53 creates the stack using information table 531, the access mode information buffer 532 and the stack control buffer 533 on the basis of the debug information file 40 supplied at the download time.

Before starting the simulation, the access mode information of the stack area used in the function to be executed first, is stored in the stack control buffer 533, which is updated if a function call or interruption demand occurs during the simulation. The access check unit 54 checks the writing access onto the stack area on the basis of the access mode information within the stack control buffer 533.

This time, these functions will be described in detail. The language processor 20 converts the user program 10 written by a high level language to a converted user program 11 written by an assembler language, and further converts it to an object of a machine language level, so to store it in the object file 30. Simultaneously, the debug information file 40 is created. The data processor 50 downloads the object file 30 and the debug information file 40, when the using stack area control unit 53 of the stack area control unit 52 creates the stack using information table 531 and the access mode information buffer 532 on the basis of the downloaded debug information file 40.

The stack using information table 531 is a table on which the size of a stack area used for an argument, the size of a stack area used for the process execution, and the initial address of the access mode information buffer 532 to be referred to are recorded for every function and interruption routine name written on the user program 10. The access mode information buffer 532 is a buffer which controls whether the stored data area for every one bit of the stack 534 is writable or not by a flag of each one bit.

The access mode information buffer 532 has such a large flag area enough to store the flags in the number obtained by adding "2", as the stack for saving the PC's value for return at the function call except for the case of initialization and the main functions to the sum of each size in the argument stack area and the using stack area, which are expressed by the byte. This flag area consists of, in the order of the most significant bite the argument stack area control flag FI, the return PC's value saving stack area control flag FS and the using stack area control flag FU. Here, in the case of the initialization and the main function, the access mode information buffer 532 corresponding to each of the case has only the flag areas for the using stack area control flag FU and not any flag areas for the flags FI and FS.

All the argument stack areas and the return PC's value-saved stack areas on the stack 534 are regarded to be write inhibited, and as the write inhibit mode, the value "0" is stored respectively in their corresponding control flags FI and FS. As for the using stack area control flag FU, the flags for the first two bits correspond to the save areas of the register h1, which are regarded to be write inhibited, and the write inhibit mode is adopted to the flags for the high order two bits, where the value "0" is stored. The rest of the control flags correspond to the automatic variable areas, which are regarded to be write enabled, and the value "1" is stored therein as the write permission mode.

The using stack area control unit 53 acquires the area for the stack control buffer 533 and initializes the same. The stack control buffer 533 consists of three information on access mode AM, initial address AS of the access mode information buffer 532 which was referred to when storing the information on the access mode AM, and bit position BP of a flag of the access mode information buffer 532.

The access mode AM is the information to be referred to when the writing onto the stack area 534 is checked by the stack area access check unit 54. When the writing onto the stack 534 is permitted referring to the access mode information buffer 532, "1" is stored in the access mode AM. When the writing is prohibited, "0" is stored therein. The information on the initial address AS and the bit position BP of the access mode information buffer 532 which are simultaneously stored, is used in order to retrieve an update starting frame when there arises a necessity of updating the content of the stack control buffer 533 upon a call of the function and interruption routine to be executed next.

The buffer area will be initialized in the following procedure when acquiring the buffer area storing the information corresponding to all the stack areas.

At first, each size of the stack areas which are used in the initialization and the first function to be executed and each initial address AS of the access mode information buffer 532 indicating each access mode of the stack areas are obtained from the stack using information table 531. Then, the contents of the control flags in the number expressed by the size of each used stack area are sequentially put in the spaces of the access mode AM of the stack control buffer 533.

Simultaneously, each initial address AS of the access mode information buffer 532 which is referred to, and each bit position BP is stored therein. At this point, the information for seven frames indicated by A is being stored in the stack control buffer 533 as indicated in FIG. 4.

After the above preparation, the process goes to the execution of the converted user program as indicated in FIG. 5. When the "push" instruction 11AA is executed, the value of the stack pointer SP varies from SP (0) to SP (1) on the stack 534. The writing check performed by the stack area access check unit 54 is not done in this case, because it is to be performed on the stack information which has been written before the current stack pointer SP's value is written.

According to the execution of each instruction to the instruction 12, the value of the stack pointer SP varies from SP (1) to SP (2) on the stack 534. Since no value is written into the stack, check is not performed in this case.

The writing for SP (1a) on the stack 534 occurs at the next instruction 13. This means the writing into the stack previous to the current stack pointer SP. Therefore, the writing check will be performed by the stack area access check unit 54.

At first, the access mode AM of the frame (frame C) indicated by the arrow C in the stack control buffer 533, corresponding to the stack SP (1a) where the writing access is requested, is checked. In this case, since the access mode AM is "1", it is known that the writing is permitted and the writing into this frame is judged to be fair. If the writing operation is judged to be unfair at the writing check, display of a warning message requests a user to judge whether the forced writing is executed or not. When the forced writing is requested by the user, the writing is forced and the processing of the instruction is continued. While, when the forced writing is not requested, the processing of the instruction is interrupted and the device goes into the command waiting state.

The writing check is also executed at the execution of writing the instructions 14 to 16 into the stack areas, similarly to the processing of the above instruction 13.

Next, "push" instruction is executed in the instructions 17 and 18, in the same processing as the instruction 11AA. The value of the stack pointer SP varies from SP (2) to SP (3), and further to SP (4) on the stack 534. The writing check performed by the stack area access check unit 54 is to be performed on the stack information which has been written before the current stack pointer SP's value is written. Therefore, the access check is not performed in this case.

When the "call" instruction 19 is executed, the data in the stack control buffer 533 is updated in the using stack area control unit 53, in the following procedure. In order to require the update starting frame, the initial address in the access mode information buffer 532 which the function and the interruption routine of the calling party refer to is required first from the stack using information table 531, and the position where the address is first registered in the space of the access mode information buffer in the stack control buffer 533 is retrieved from the head. In this case, the address to be retrieved is "addr*main", and the frame indicated by the arrow D (frame D) is the position where the address has been registered first.

Referring to the bit position BP of this frame D, the bit position is "5". Owing to this, it is understood that the information for six bits from "0" to "5", and including this frame D is stored as the information on the using stack of the main function. As a result, the update starting frame is from the frame D to the frame, six frames ahead of it, indicated by the arrow E (frame E).

When the update starting frame is decided, the data in the stack control buffer 533 is updated. The size of the stack area and the size of the stack for the argument for use in the function and interruption routine to be executed this time, and the initial address of the access mode information buffer 532 indicating the access mode of the stack area are obtained from the stack using information table 531. Then, the contents of the control flags in the number obtained by adding the saved return PC's value "2" to the size of the using stack area and the size of the argument stack area, from the most significant bit of the access mode information buffer 532 (here, the buffer indicated by "addr*sub") indicating the initial address, are sequentially put in the spaces of the access mode AM from the update starting frame E in the stack control buffer 533.

Simultaneously, each initial address AS (in this case, "addr*sub") of the access mode information buffer 532 referred to, and each bit position BP is stored therein. At this point, the information for fifteen frames indicated by A and B is being stored in the stack control buffer 533 as indicated in FIG. 4.

Though the writing onto the stack 534 occurs at the execution of the "call" instruction 19, the writing is performed on the stack information later than that of the current stack pointer SP, so that the writing check is not performed. According to the instruction 19, the value of the stack pointer SP varies from SP (4) to SP (5) in the state of the stack 534.

The "push" instruction 26 will be executed this time. The value of the stack pointer SP varies from SP (5) to SP (6) in the stack 534. Also in this case, since the writing is performed on the stack information later than that of the current stack pointer SP, the writing check is not performed.

According to the "pop" instruction 27, the value of the stack pointer SP varies from SP (6) to SP (5) on the stack 534.

According to the "ret" instruction 28, the value of the stack pointer SP varies from SP (5) to SP (4) on the stack 534 similarly, and the processing returns to the main function.

According to a series of "pop" instructions from 20AA to 24, the value of the stack pointer varies to SP (0) on the stack 534, and at the next "ret" instruction 25, the simulation is completed.

Executing the simulation of the user program in this way can prevent from unreasonable writing into the stack, the unreasonable writing causing a trouble in the simulation thereafter if the unreasonable writing of the save position of the PC's value and the register value occurs.

This time, the data processing method according to the first embodiment of the present invention mentioned above will be explained with reference to the flow chart of FIG. 6A, FIG. 6B and FIGS. 1 to 4.

After activation of the data processor 50, a user program is downloaded (Step 601), and simultaneously, the debug information file 40 is read out so to create the stack using information table 53 and the access mode information buffer 532, as indicated in FIGS. 2 to 4 (Step 602). By the use of the stack using information table 531 and the access mode information buffer 532, the area of the stack control buffer 533 is acquired and initialized (Step 603).

After this initializations the data processor goes into the command input waiting state (Step 604). When detecting a command input (Step 605), the command is processed (Step 606). When the command is the end command of the data processor 50 (Step 607), the data processor 50 is terminated.

As the result of the command process, if the instruction execution flag is set there (Step 608), it starts one instruction processing (Step 609). If the instruction is the processing starting instruction of the function or the interruption such as the "call" instruction or the "brk" instruction (Step 610), the information of the stack control buffer 533 is updated (Step 611).

At the execution of every instruction (Step 612), the stack access check is performed. This stack access check includes the writing check by the stack control buffer 533, in addition to the conventional stack overflow check. First, the stack overflow check is performed. If the stack overflow has occurred (Step 613), with an error message displayed (Step 614), the execution of the instruction is interrupted (Step 615).

After the stack overflow check, it is checked whether the writing into the older stack area occurred or not by the comparison between the current stack pointer SP's value and the writing demand address (Step 616). If such writing occurred, the writing check is performed by the use of the stack control buffer 533 (Step 617).

When the access mode AM of the corresponding stack in the stack control buffer 533 is the writing prohibit mode (Step 618), with a warning message issued (Step 619), a user is requested to determine whether the forced writing is performed or not (Step 620). When the forced writing is requested, the writing processing into the stack is performed (Step 621). When no forced writing is requested, the execution is interrupted (Step 622) and the process returns to the command input waiting mode (Step 604).

After the execution of each instruction, when the instruction interruption flag set upon the occurrence of an error and a break is OFF (Step 623), it goes to the processing of the next instruction. If the instruction interruption flag is ON when there arises a necessity of processing the breakpoint or the like, the instruction is interrupted (Step 624) and it goes into the command input waiting mode (Step 604).

This time, the data processing method according to the second embodiment of the present invention will be described hereinafter.

The data processor of the above first embodiment is constituted in that a warning message is always issued when the writing processing into the stack other than that of the writing permission mode is generated. However, such a stack operation is not always the abnormal processing in fact.

Figure 7:
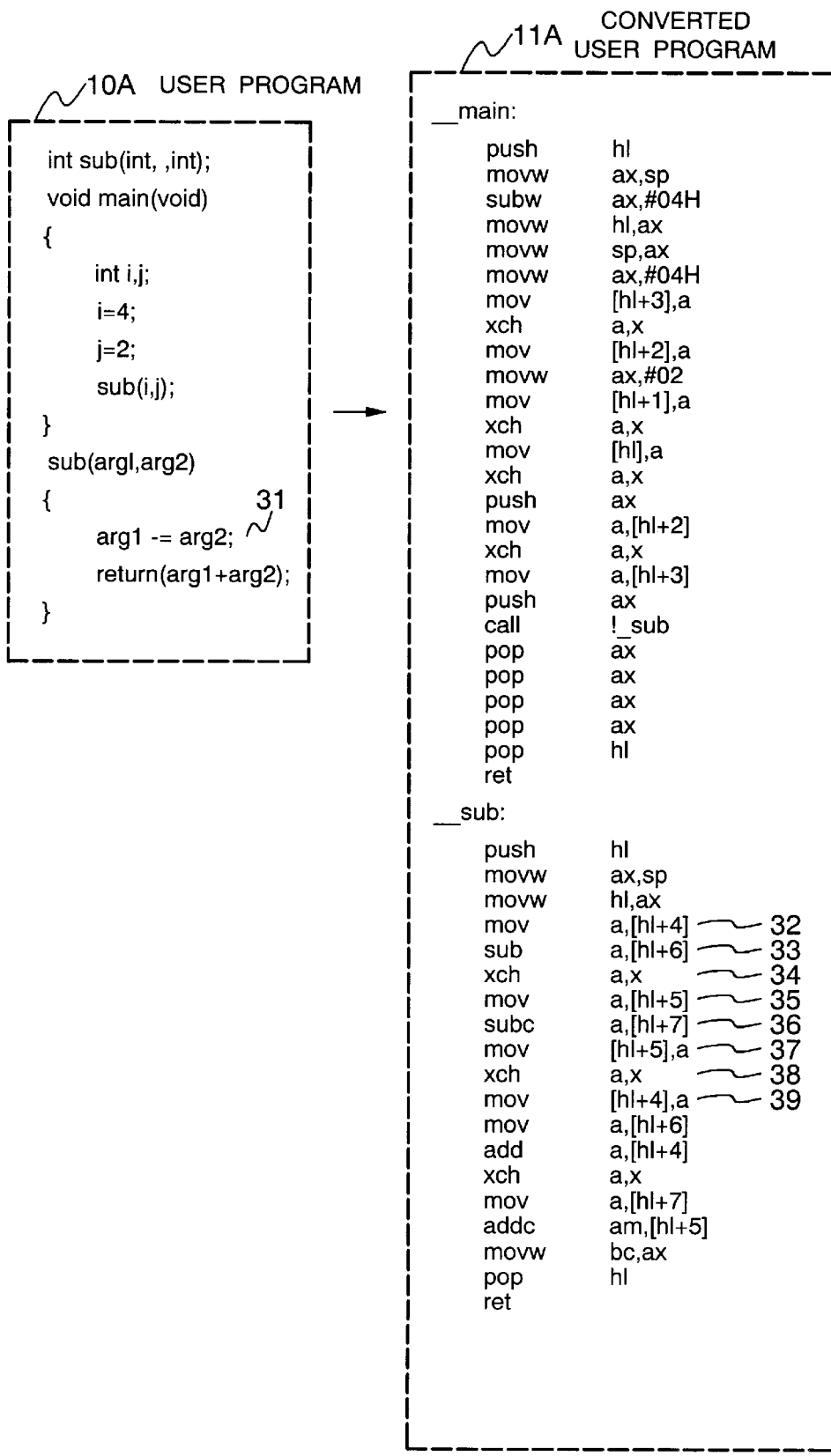
FIG. 7 is a schematic view for use in describing another example of a user program.
Figures 8, 9:
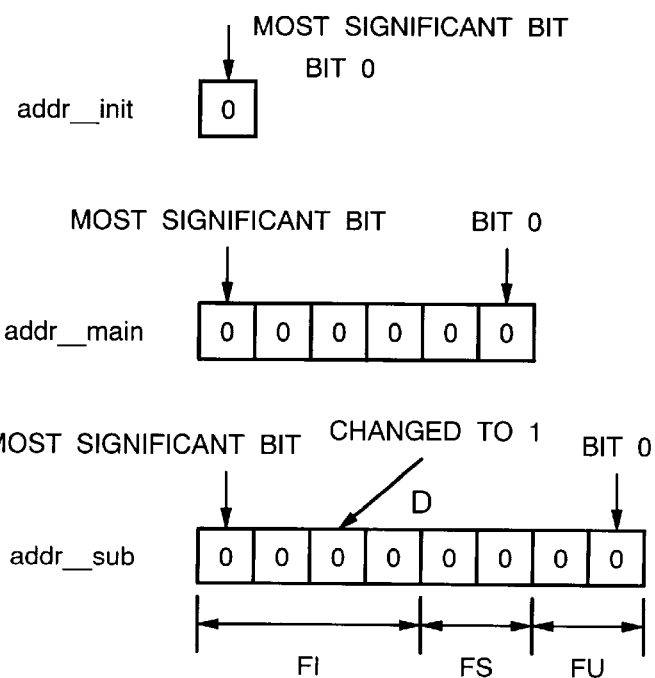
FIG. 8 is a schematic view for use in describing the state of the stack using information table of the using stack area control unit corresponding to the user program of FIG. 7.
FIG. 9 is a schematic view for use in describing the state of the access mode information buffer of the using stack area control unit corresponding to the user program of FIG. 7.

An example of this kind of normal writing processing will be described with reference to FIG. 7 showing one example of the user program 10A causing a normal writing into the stack area other than that of the writing permission mode, and FIGS. 8 to 10 respectively showing the constitutions of a stack using information table 531A, an access mode information buffer 532A, and a stack control buffer 533A and a stack 534A according to this embodiment.

The user program 10A of FIG. 7 is not an unfair program, in which one line of the instruction 31 is added to the user program 10 indicated in the first embodiment. The instruction 31 of one line is turned into the additional instructions 32 to 39 in the converted user program 11AA translated into the assembler language. Therefore, when the instructions one ahead of the instruction 32 have been executed by the data processor 50,
the state of the stack using information table 531A, the access mode information buffer 532A, the stack control buffer 533A and the stack 534A is similar to that in the first embodiment.

The instruction 36 causes the writing into the stack. The stack area on which the writing is performed corresponds to SP (3) on the stack 534A under the condition indicated in FIG. 10. Since the value SP (3) means that the stack area thereof is older than the stack area of the stack pointer SP's value at that point, or SP (6), it is necessary to do the writing check.

Since the frame corresponding to the writing demand stack SP (3a) is the frame A indicated by the arrow A in the stack control buffer 533A, the value of the access mode AM of the frame A is "0", which means that it is in the writing prohibit mode. In such a case, the data processor of the first embodiment would always issue a warning message, requesting a user to confirm the execution of the forced writing. When the forced writing is requested, the data processor of the first embodiment would execute the writing into the stack and continue the processing.
Otherwise, the processing would be interrupted.

The instruction 39 also causes the writing processing into the old stack. When checking the frame B in the stack control buffer 533A indicated by the arrow B, which corresponds to the writing desired stack, the access mode AM is write prohibited. Therefore, a warning message would be issued in the first embodiment, in the same way as the instruction 36.

These instructions 36 and 39, however, are not unfair access, but are intended to rewrite the argument by a user.

In the second embodiment, a warning message is not always issued in such a case. The second embodiment is characterized in that, after the warning message is once issued, requesting a user to confirm the execution of the forced writing, in the case of selecting the force writing demand, the corresponding access mode AM in the stack control buffer 533A and the corresponding control flag in the access mode information buffer 532A are changed to be write permitted, thereby to stop the issue of the warning message thereafter.

More specifically, in the second embodiment, the access mode AM in the stack control buffer 533A is arranged so that the mode can be changed from the write prohibit to the write permission upon the receipt of the forced writing demand into the stack 534A by the user. At the same time, the address and the control flag in the access mode information buffer 532A which was referred to at the time of registering the access mode AM can be retrieved from the frame where the access mode AM in the stack control buffer 533A has been rewritten. Accordingly, the control flag in the access mode information buffer 532 is arranged so that it may be changed to be write permitted value.

The stack control reflecting the user's intention is enabled by adding such a function.

Figure 11A:
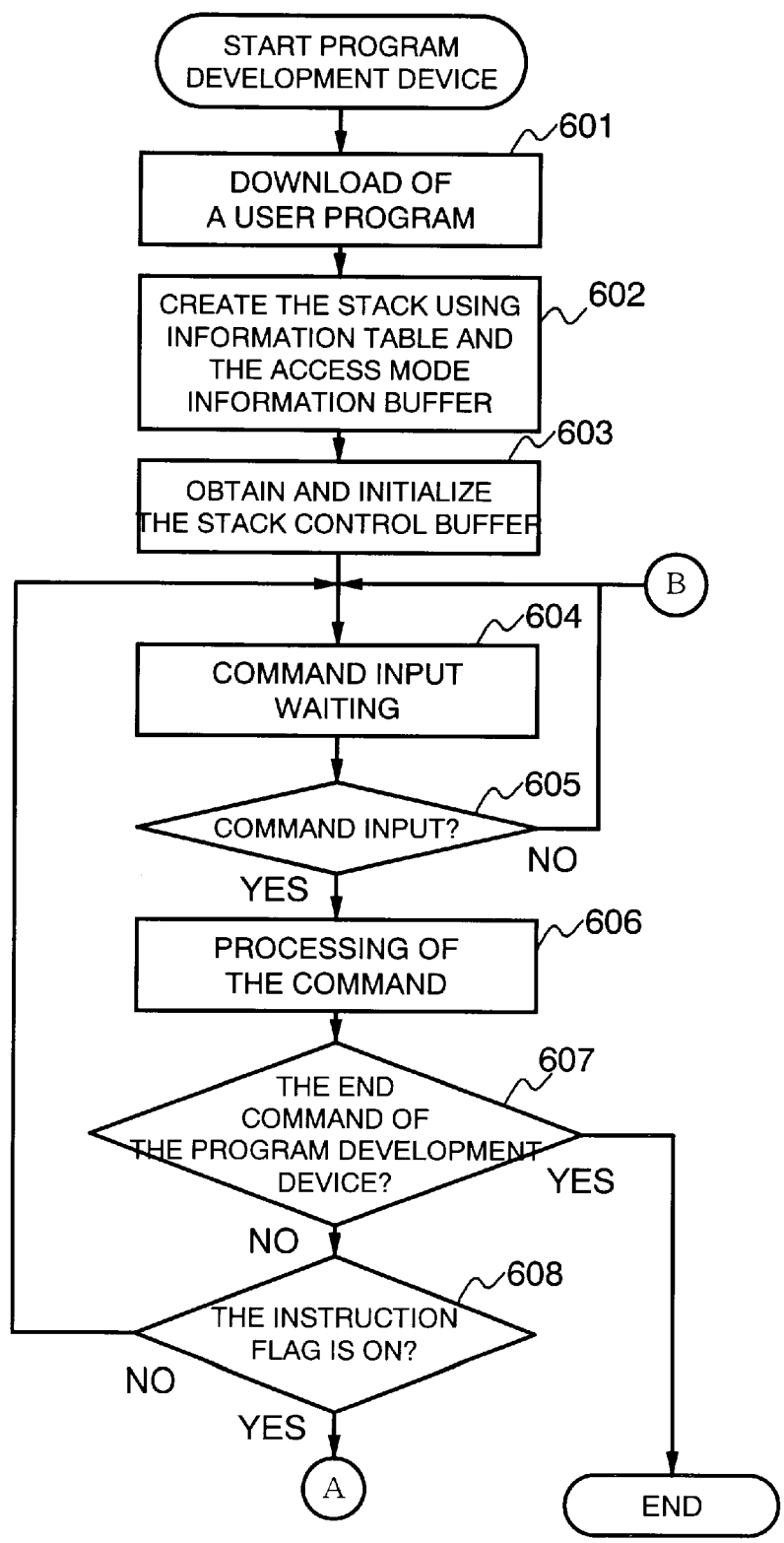
FIG. 11A and FIG. 11B are a flow chart for use in describing a data processing method according to a second embodiment of the present invention.
Figure 11B:
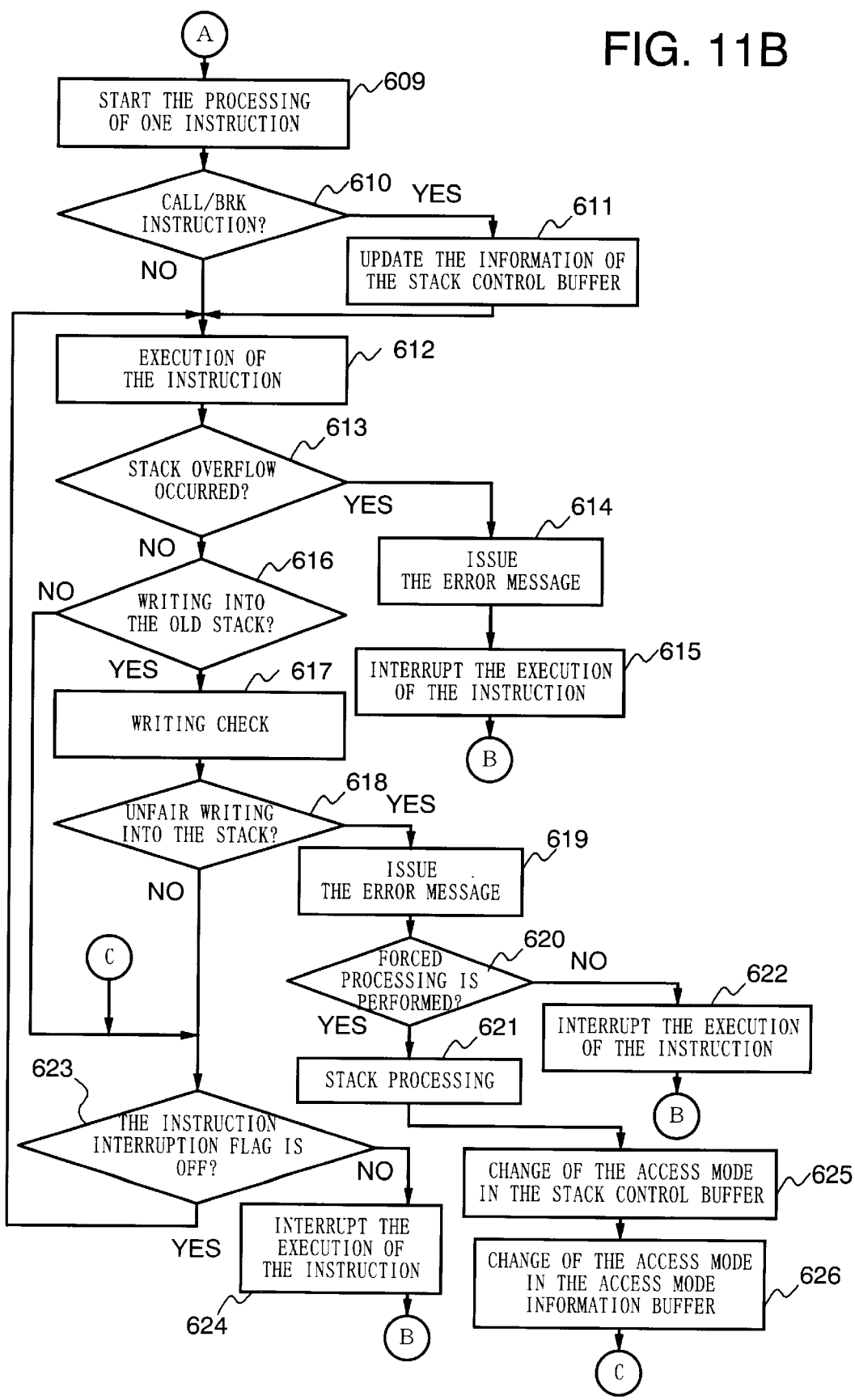
Figure 12:
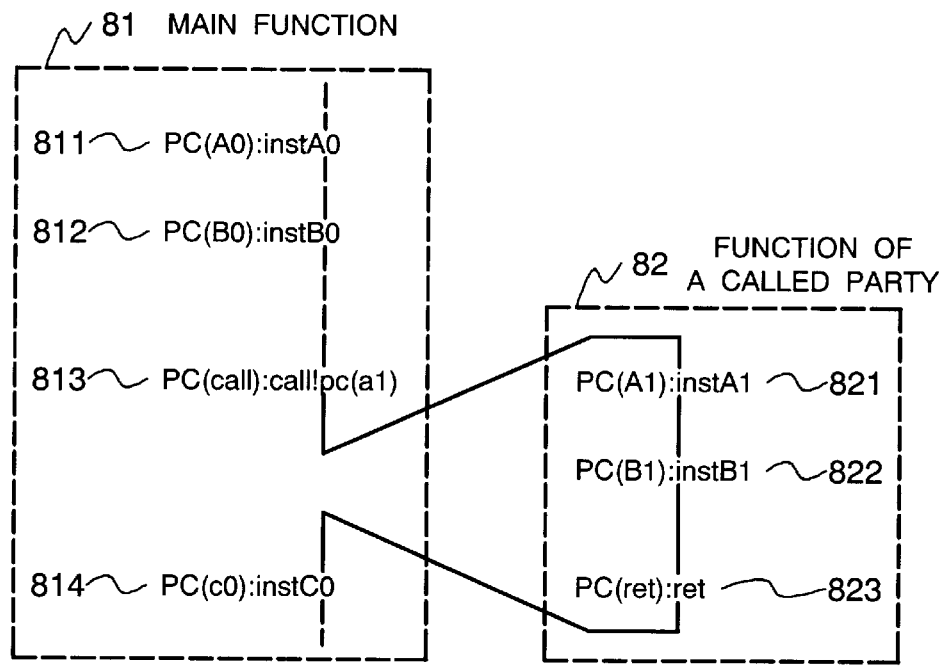
FIG. 12 is a view for use in describing an operation of saving the PC's value on the stack and returning there.
Figure 13:
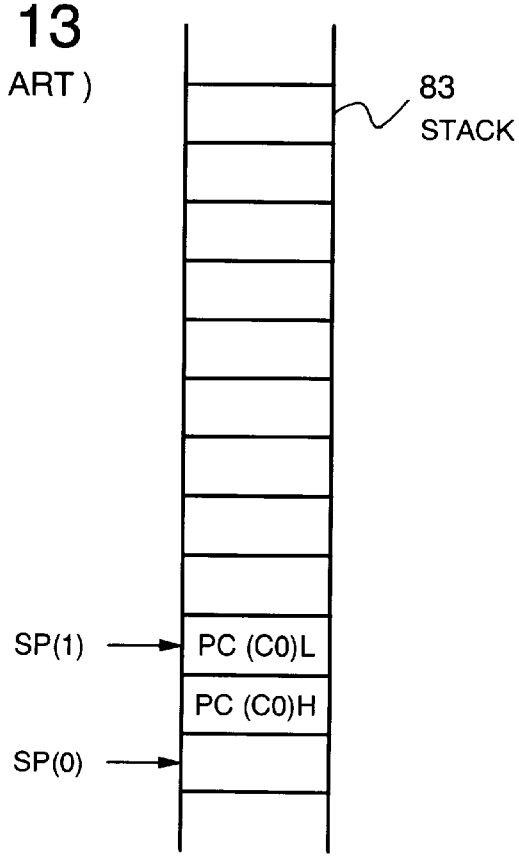
FIG. 13 is a view for use in describing an operation of saving the PC's value on the stack and returning there.
Figure 14:
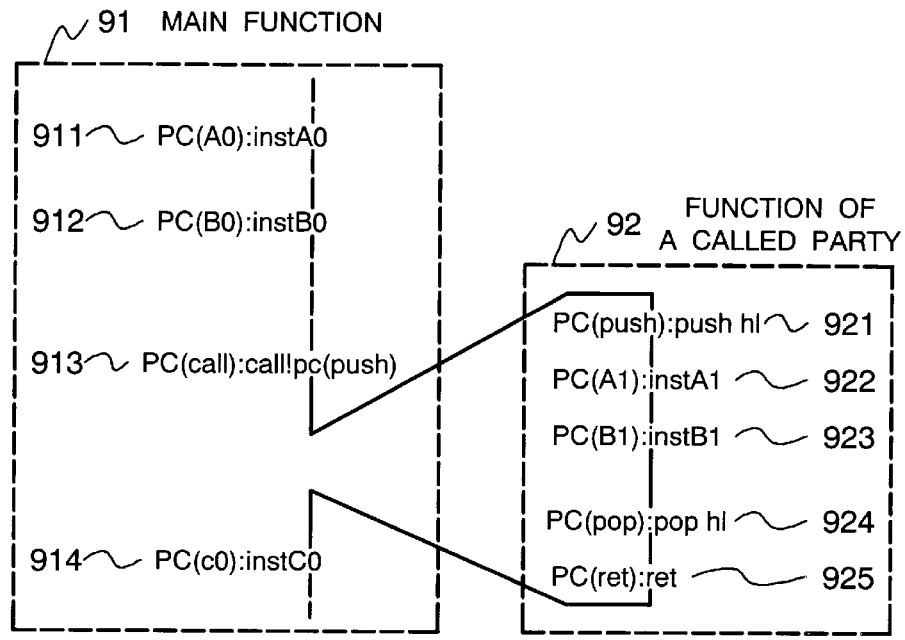
FIG. 14 is a view for use in describing an operation of saving the PC's value and register's value on the stack and returning there.
Figure 15:
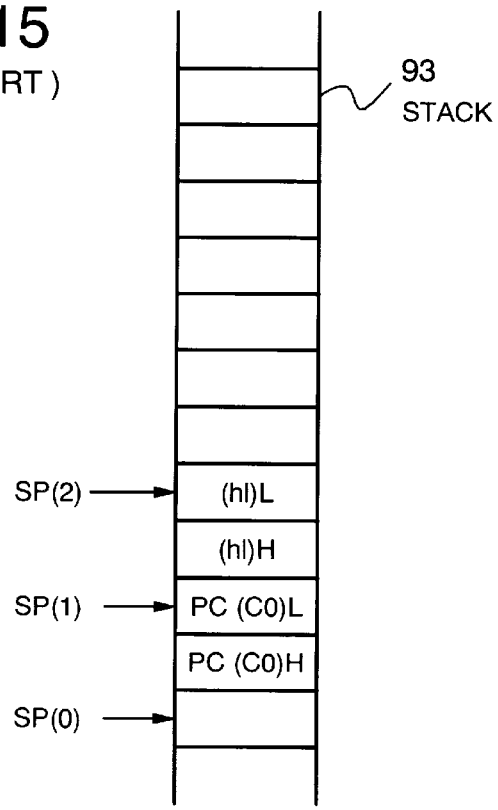
FIG. 15 is a view for use in describing an operation of saving the PC's value and register's value on the stack and returning there.
Figure 16:
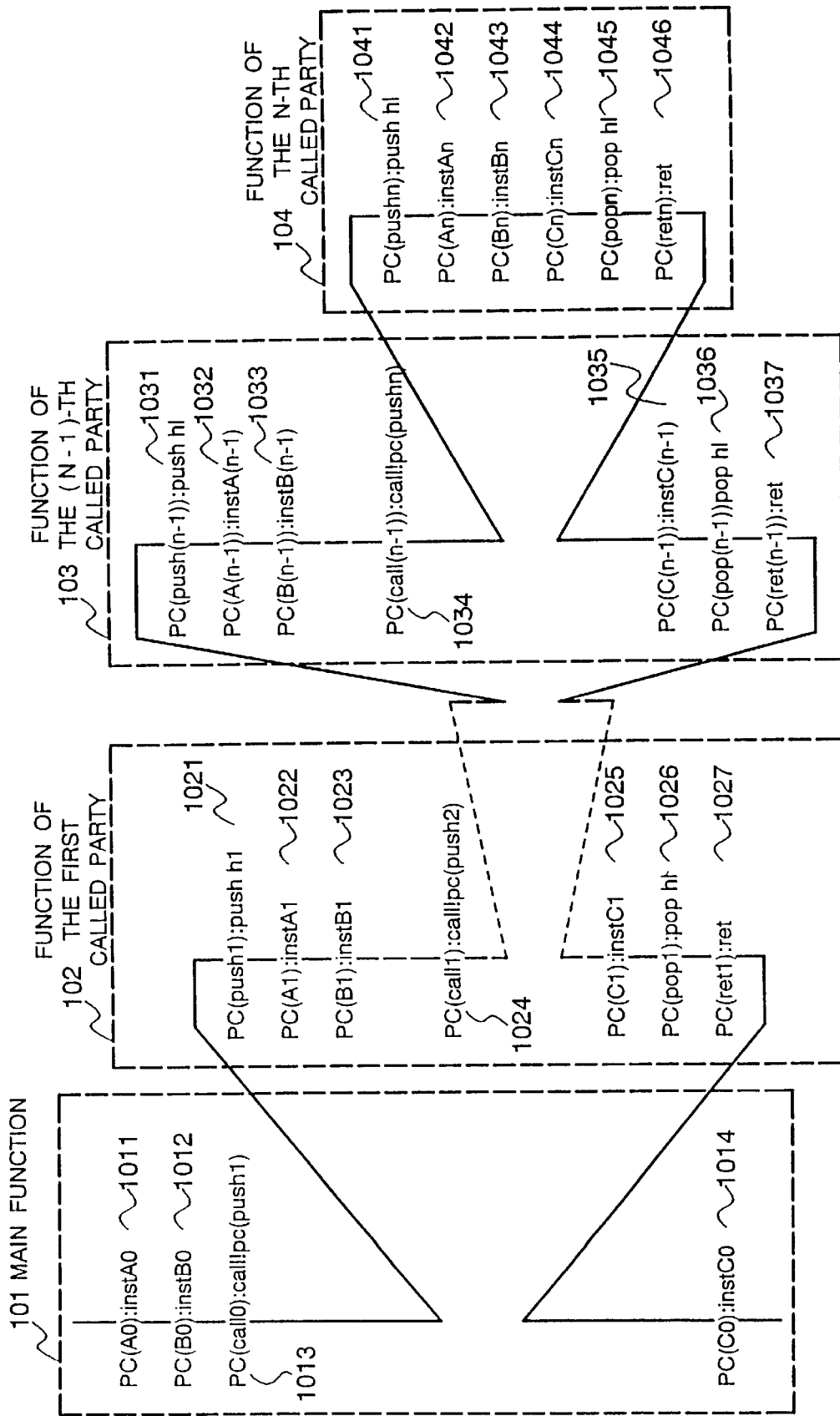
FIG. 16 is a view for use in describing an operation of saving the data on the stack and returning there in the case of calling a function in a nest shape.
Figure 17:
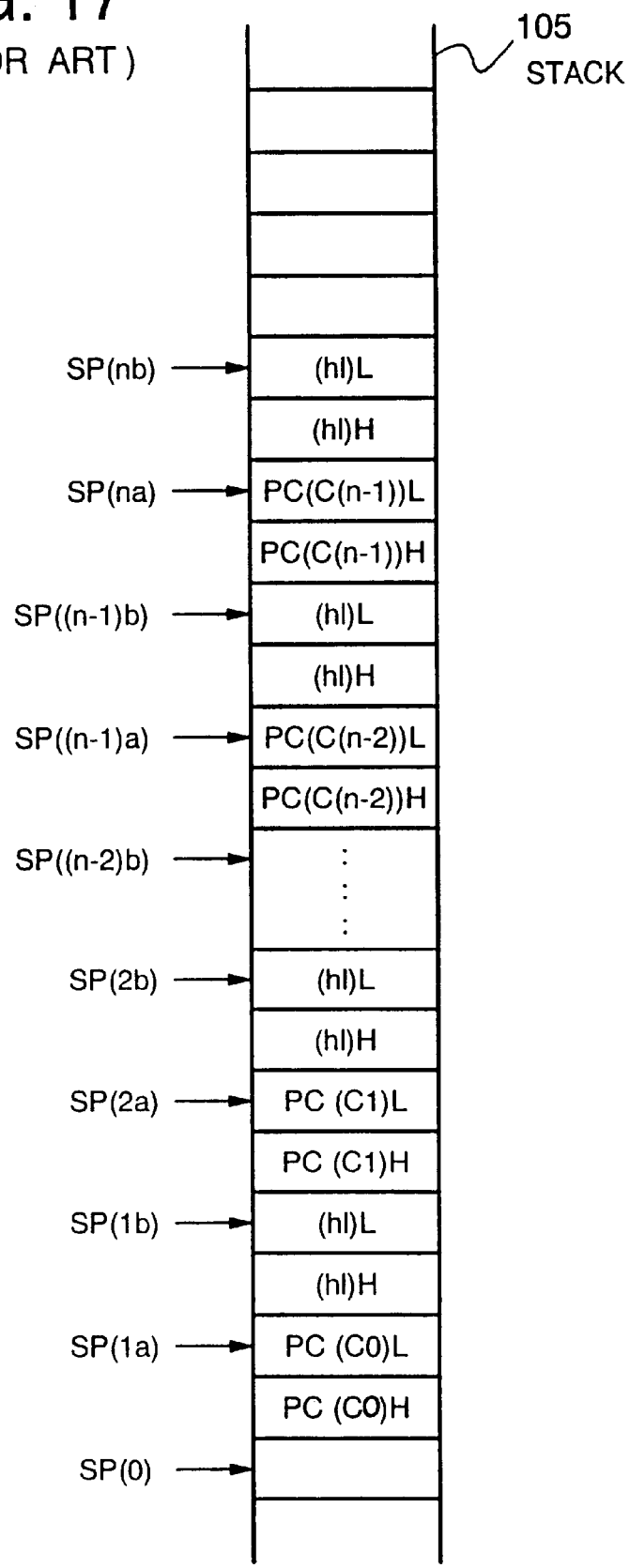
FIG. 17 is a view showing the state of the stack for use in saving the program of FIG. 16 and returning there.
Figure 18:
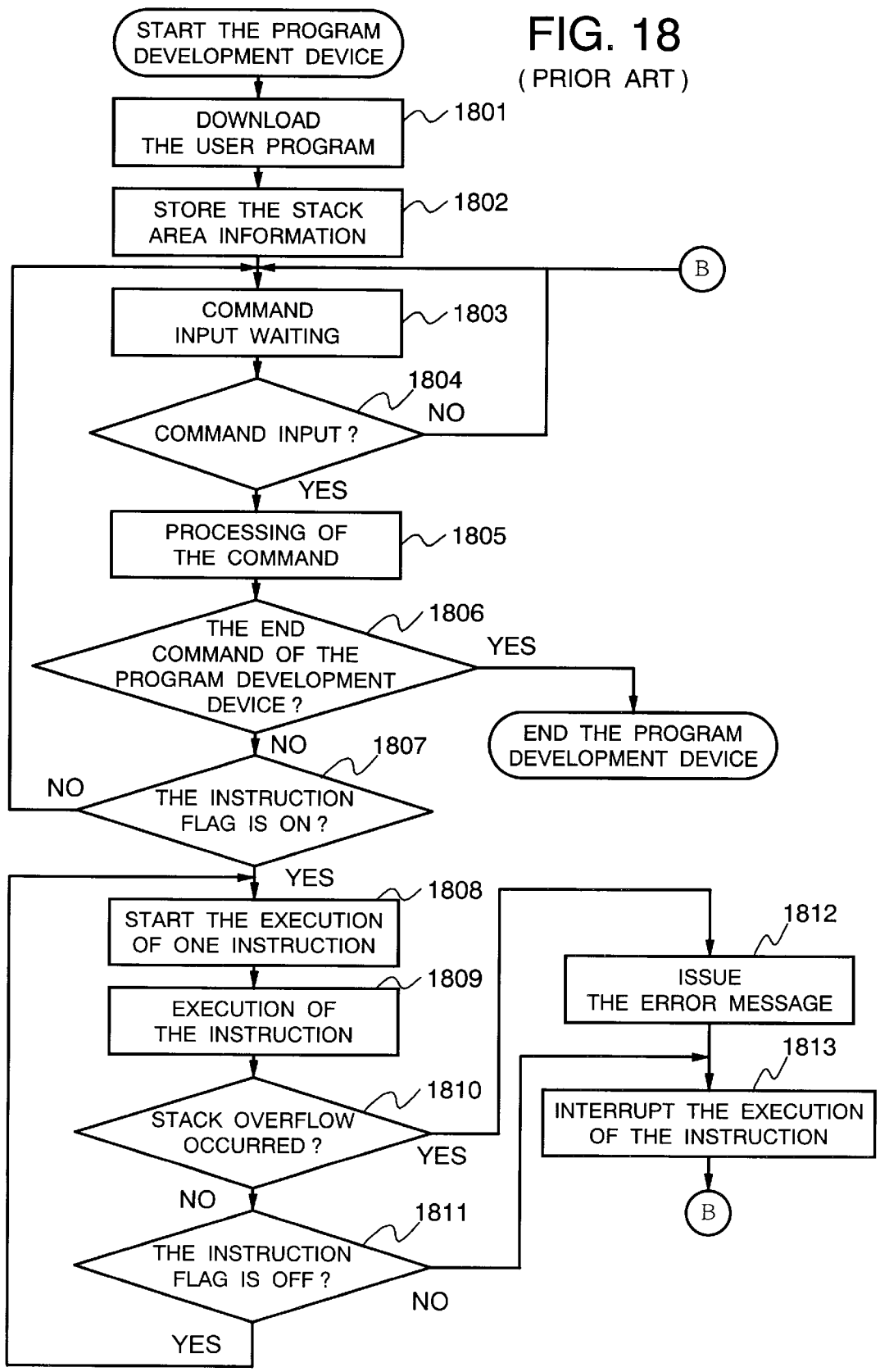
FIG. 18 is a flow chart showing a data processing method according to the first conventional data processor.
Figure 19:
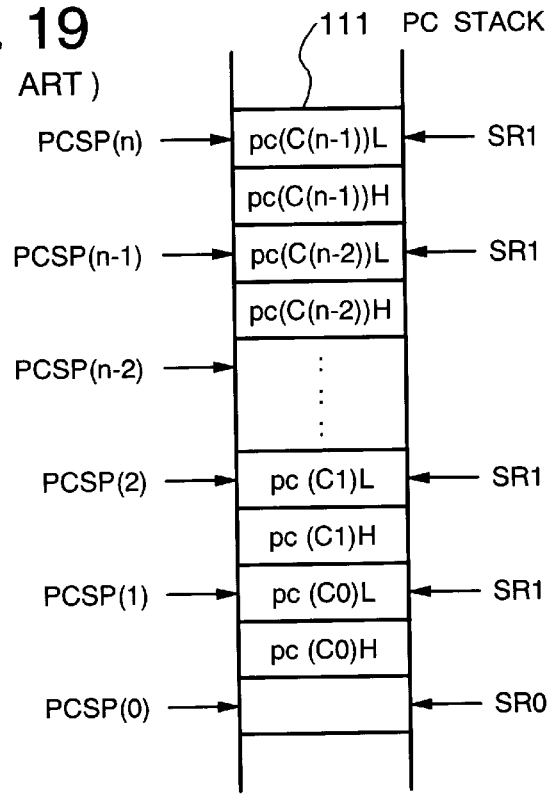
FIG. 19 is a schematic view showing the stack area for use in describing an operation according to the second conventional data processor.
Figure 20:
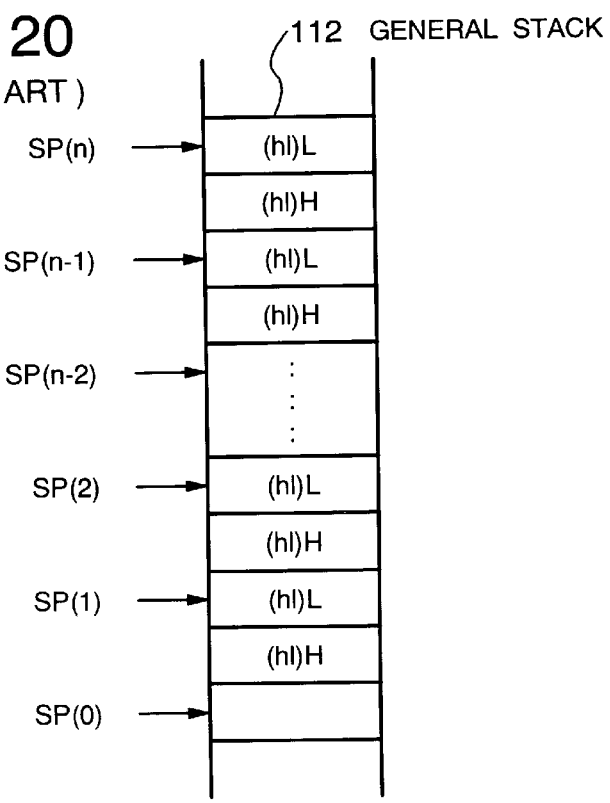
FIG. 20 is a schematic view showing the stack area for used in describing an operation according to the second conventional data processor.

The processing method of the second embodiment will be described with reference to FIGS. 8 to 10 and the flow chart of FIG. 11A, FIG. 11B showing an operation according to the data processing method of the second embodiment of the present invention. In the flow chart of FIG. 11A and FIG. 11B, the same reference characters and numerals are attached to the same steps as in the flow chart of FIG. 6A, FIG. 6B. The difference between the above mentioned first embodiment and the second embodiment is that the Step 625 of changing the access mode AM in the stack control buffer 533A and the Step 626 of changing the control flag in the access mode information buffer 532A so to change the access mode are added to the first embodiment, after the forced writing is selected in Step 620 in reply to the issue of the warning message (Step 619) and the forced writing is executed in Step 621.

An operation of the data processing method according to the second embodiment will be described. After starting the data processors the process from Step 601 of downloading the user program 10A to Step 621 of executing the forced writing is similar to the first embodiment.

In the second embodiment, at the execution of the forced writing, the access mode AM in the stack control buffer 533 corresponding to the forced writing desired stack is changed (Step 625) and the access mode in the access mode information buffer 532A corresponding to the forced writing desired stack is changed (Step 626).

For example, when the forced writing is allowed to the frame A in the stack control buffer 533A, the access mode AM of the frame indicated by the arrow C is changed from "0" (write prohibit) to "1" (write permit). Since it is understood that this frame is referred to the control flag with the bit position five in the access mode information buffer 532A in which the initial address is "addr*sub", the control flag indicated by the arrow D in the access mode information buffer 532A is changed from "0" (write prohibit) to "1" (write permit).

Owing to this, while the stack information is loaded on the stack, the access mode AM in the stack control buffer 533A is changed to the write permission Therefore, when the writing is performed on the stack next time, the warning message is not generated.

When loading the stack information on the stack again, since the mode of the corresponding control flag in the access mode information buffer 532A is in the write permission mode, the access mode is write permission when updating the stack control buffer 533A, and the warning does not appear at the writing processing into the stack.

Hereinafter, at the result of confirming that the instruction interruption flag is OFF after the completion of the processing of each instruction (Step 623), when the instruction interruption flag is ON, the instruction interrupting processing is performed (Step 624) and the processor goes into the command input waiting mode (Step 604), similarly to the first embodiment.

As set forth hereinabove, in the data processor and the data processing method of the present invention, since the stack area control unit 52 comprises the using stack area control unit 53 for controlling the stack area intended for instructions including the function and interruption routine constituting a user program and a stack area access check unit 54 for detecting unfair access operation on the above stack area, the destruction of the data, the unfair execution of the program and the run-away of the program can be prevented properly. Further, since there is no need to be provided with two kinds of stack areas; a PC stack area proposed only to save the PC's value and a general stack area proposed to save the other data, two stack pointers for their operation and a register for controlling each area like the second conventional embodiment, the data processor and the data processing method according to the present invention don't make the hardware large in the scale.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data processor, for use in program development for a microcomputer which uses a stack area in order to save a program counter's value, provided with a debug means for performing a simulation and a debug on a user program and a stack area control means for controlling the stack area, wherein said stack area control means comprising:

a using stack area control means for controlling the stack area used by an instruction including functions and interruption routines constituting the user program, according to an access mode information indicating write permit or write inhibit; and a stack area access check means for detecting an abnormal access operation in the stack area on the basis of the access mode information, wherein said using stack area control means comprises a stack using information table with a size information on the stack area used for an argument, a size information on the stack area used for a process execution and an initial address of an access mode information buffer referred to, recorded thereon, as for each of the functions and interruption routines, an access mode information buffer which stores a flag indicating write permit or write inhibit in every area by a storing unit, depending on the using area size of the stack area, in every function and interruption routine, and a stack control buffer which, correspondingly to each frame of the stack area, stores the flags in the number of the size of a using stack area in reference to said access mode information buffer, as access mode information referred to at a write check into the stack area by said area access check means.

2. A data processor as set forth in claim 1, wherein said stack control buffer stores an initial address of said access mode information buffer referred to and a bit position information on the flag stored as the access mode information in said access mode information buffer.

3. A data processor as set forth in claim 1, wherein said access mode information buffer has flag storing areas in the number as summed up by the size of the stack area used for the argument, the size of the stack area used for the process execution and the size of the stack area for saving the program counter's value.

4. A data processor as set forth in claim 1, wherein said using stack area control means comprises an access mode information changing means for forcibly changing the access mode information stored in said stack control buffer controlled by said using stack area control means, and said stack area access check means performs an access check only on the writing into the stack area previous to that of the current stack pointer with reference to the access mode information of said stack control buffer and as for a write demand into the stack area where the access mode information is of write inhibit, issues a message indicating that the writing is unreasonable, then to request a user to confirm the execution of a forced writing, and said access mode information changing means changes the access mode information corresponding to the write demanded stack area of said stack control buffer upon receipt of the forced writing request at the confirmation of the forced writing.

5. A data processor as set forth in claim 1, wherein the stack control buffer, correspondingly to each frame of the stack area, stores an initial address of said access mode information buffer referred to and a bit position information on the flag stored as the access mode information in said access mode information buffer, said using stack area control means comprises a means for forcibly changing the access mode information stored in said stack control buffer controlled by said using stack area control means and the flag of said access mode information buffer, said stack area access check means performs an access check only on the writing into the stack area previous to that of the current stack pointer with reference to the access mode information of said stack control buffer and as for a write demand into the stack area where the access mode information is of write inhibit, issues a message indicating that the writing is unreasonable, then to request a user to confirm the execution of a forced writing, and said access mode information changing means changes the access mode information corresponding to the write demanded stack area of said stack control buffer upon receipt of the forced writing request at the confirmation of the forced writing.

6. A data processors for use in program development for a microcomputer which uses a stack area in order to save the program counter's value, provided with a debug means for performing a simulation and a debug on a user program and a stack area control means for controlling the stack area, wherein said stack area control means comprising:

a using stack area control means for controlling the stack area used by an instruction including functions and interruption routines constituting the user program, according to an access mode information indicating write permit or write inhibit; and a stack area access check means for detecting an abnormal access operation in the stack area on the basis of the access mode information;

said using stack area control means comprising:

a stack using information table with a size information on the stack area used for an argument, a size information on the stack area used for a process execution and an initial address of an access mode information buffer referred to, recorded thereon, as for each of the functions and interruption routines;

an access mode information buffer which stores a flag indicating write permit or write inhibit in every area by a storing unit depending on the using area size of the stack area, in every function and interruption routine; and a stack control buffer which, correspondingly to each frame of the stack area, stores the flags in the number of the size of a using stack area in reference to said access mode information buffer, as access mode information referred to at a write check into the stack area by said stack area access check means;

said stack area access check means performs an access check only on the writing into the stack area previous to that of the current stack pointer with reference to the access mode information of said stack control buffer, and as for a write demand into the stack area where the access mode information is of write inhibit, issues a message indicating that the writing is unreasonable, then to request a user to confirm the execution of a forced writing.

7. A data processor as set forth in claim 6, wherein said using stack area control means comprises a means for forcibly changing the access mode information stacked in said stack control buffer controlled by said using stack area control means, and said access mode information changing means changes the access mode information corresponding to the write demanded stack area of said stack control buffer upon receipt of the forced writing request at the confirmation of the forced writing.

8. A data processing method of performing a simulation and debug on a user program for use in program development for a microcomputer which uses a stack area in order to save a program counter's value, comprising the steps of:

a step of registering information on the stack area used by an instruction including functions and interruption routines constituting the user program and access mode information indicating whether the stack area is write permitted or not in every storing unit, into a stack area control means for controlling the stack area;

a step of updating the access mode information of the stack area being used, which varies during execution of the user program, by storing the same information into said stack area control means one after another;

a step of checking unreasonable writing into the stack area on the basis of the access mode information;

a step of issuing a message indicating the occurrence of the unreasonable writing access into the stack area if it is detected in said unreasonable write check step, a step of issuing a message requesting a user to confirm the execution of a forced writing by means of the writing access, and a step of executing the writing access when receiving the force writing demand at the confirmation of the forced writing.

9. A data processing method as set forth in claim 8, wherein in the step of executing the writing access, changing the access mode information of said stack area control means into write permit mode.

10. A data processing method of performing a simulation and debug on a user program for use in program development for a microcomputer which uses a stack area in order to save a program counter's value, comprising the steps of:

a step of registering information on the stack area used by an instruction including functions and interruption routines constituting the user program and access mode information indicating whether the stack area is write permitted or not in every storing unit, into a stack area control means for controlling the stack area;

a step of updating the access mode information of the stack area being used, which varies during execution of the user program, by storing the same information into said stack area control means one after another; and a step of checking unreasonable writing into the stack area on the basis of the access mode information, wherein said using stack area control means comprises a stack using information table with a size information on the stack area used for an argument, a size information on the stack area used for a process execution and an initial address of an access mode information buffer referred to, recorded thereon, as for each of the functions and interruption routines, an access mode information buffer which stores a flag indicating write permit or write inhibit in every area by the storing unit depending on the using area size of the stack area, in every function and interruption routine, and a stack control buffer which, correspondingly to each frame of the stack area, stores the flags in the number of the size of a using stack area in reference to said access mode information buffer, as the access mode information referred to at a write check into the stack area by said stack area access check means, and which stores an initial address of said access mode information buffer referred to and a bit position information on the flag stored as the access mode information in said access mode information buffer, and in said unreasonable write check step, an access check is performed only on the writing into the stack area previous to that of the current stack pointer with reference to the access mode information of said stack control buffer.

11. A data processing method as set forth in claim 10, further comprising a step of issuing a message indicating the occurrence of the unreasonable writing access into the stack area if it is detected in said unreasonable write check step, a step of requesting a user to confirm the execution of a forced writing as for the unreasonable writing access, and a step of, upon receipt of the forced writing demand at the confirmation of the forced writing, changing the access mode information corresponding to the writing demanded stack area in said stack control buffer, into write permit mode.

12. A data processor, for use in program development for a microcomputer which uses a stack area in order to save a program counter's value, provided with a debug means for performing a simulation and a debug on a user program and a stack area control means for controlling the stack area, wherein said stack area control means comprising:

a using stack area control means for controlling the stack area used by an instruction including functions and interruption routines constituting the user program, according to an access mode information indicating write permit or write inhibit; and a stack area access check means for detecting an abnormal access operation in the stack area on the basis of the access mode information, wherein said stack area access check means performs an access check only on the writing into the stack area previous to that of the current stack pointer on the basis of the access mode information, and as for a write demand into the stack area where the access mode information is of write inhibit, issues a message indicating that the writing is unreasonable, then to request a user to confirm the execution of a forced writing.

13. A data processor, for use in program development for a microcomputer which uses a stack area in order to save a program counter's value, provided with a debug means for performing a simulation and a debug on a user program and a stack area control means for controlling the stack area, wherein said stack area control means comprising:

a using stack area control means for controlling the stack area used by an instruction including functions and interruption routines constituting the user program, according to an access mode information indicating write permit or write inhibit; and a stack area access check means for detecting an abnormal access operation in the stack area on the basis of the access mode information, wherein said using stack area control means comprises a means for forcibly changing the access mode information of the stack area.

* * * * *